US012541166B2

(12) United States Patent
Taguchi et al.

(10) Patent No.: US 12,541,166 B2
(45) **Date of Patent: *Feb. 3, 2026**

(54) IMAGE FORMING DEVICE HAVING DRAWER

(71) Applicant: BROTHER KOGYO KABUSHIKI KAISHA, Nagoya (JP)

(72) Inventors: Kazuna Taguchi, Nagoya (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/785,290

(22) Filed: Jul. 26, 2024

(65) Prior Publication Data

US 2024/0385560 A1 Nov. 21, 2024

Related U.S. Application Data

(63) Continuation of application No. 18/066,501, filed on Dec. 15, 2022, now Pat. No. 12,105,456, which is a (Continued)

(30) Foreign Application Priority Data

Sep. 2, 2019 (JP) ................................ 2019-159904

(51) Int. Cl.
*G03G 15/08* (2006.01)
*G03G 15/00* (2006.01)
(Continued)

(52) U.S. Cl.
CPC ....... *G03G 15/5054* (2013.01); *G03G 15/087* (2013.01); *G03G 21/105* (2013.01); *G03G 21/181* (2013.01)

(58) Field of Classification Search
None
See application file for complete search history.

(56) References Cited

U.S. PATENT DOCUMENTS 10,108,138 B2 10/2018 Sato et al.
10,969,730 B2 4/2021 Sueshige et al.
(Continued)

FOREIGN PATENT DOCUMENTS

JP 5-257340 A 10/1993
JP 2010-66701 A 3/2010
(Continued)

OTHER PUBLICATIONS

Office Action issued in corresponding Japanese Patent Application No. 2019-159904, Apr. 18, 2023.

*Primary Examiner* — Sevan A Aydin
(74) *Attorney, Agent, or Firm* — Merchant & Gould P.C.

(57) ABSTRACT

An image forming device, including: a drawer movable from an inside position where the drawer is located inside a housing to an outside position where the drawer is located outside the housing via an intermediate position; a stopper movable between a first position where the stopper stops the drawer from moving from the intermediate position to the outside position and a second position where the stopper allows the drawer to move from the intermediate position to the outside position; a drum cartridge mountable on the drawer; and a toner cartridge mountable on the drawer; wherein the toner cartridge mounted on the drawer is detachable from the drawer in a state in which the drawer is located at the intermediate position, and wherein the drum cartridge mounted on the drawer is detachable from the drawer in a state in which the drawer is located at the outside position.

8 Claims, 20 Drawing Sheets

Related U.S. Application Data continuation of application No. 17/554,263, filed on Dec. 17, 2021, now Pat. No. 11,556,085, which is a continuation of application No. 17/003,068, filed on Aug. 26, 2020, now Pat. No. 11,231,674.

(51) Int. Cl.
*G03G 21/10* (2006.01)
*G03G 21/18* (2006.01)

(56) References Cited

U.S. PATENT DOCUMENTS

| | | | | |
|---|---|---|---|---|
| 11,231,674 | B2 * | 1/2022 | Taguchi | G03G 15/5054 |
| 11,556,085 | B2 | 1/2023 | Taguchi et al. | |
| 2005/0271425 | A1 * | 12/2005 | Shimomura | G03G 21/1647 399/258 |
| 2006/0062603 | A1 | 3/2006 | Choi | |
| 2007/0065184 | A1 * | 3/2007 | Sato | G03G 15/0875 399/262 |
| 2009/0016767 | A1 | 1/2009 | Koido | |
| 2009/0060586 | A1 | 3/2009 | Ishiguro et al. | |
| 2009/0304412 | A1 * | 12/2009 | Hattori | G03G 21/1842 399/111 |
| 2009/0324275 | A1 * | 12/2009 | Okabe | G03G 21/1867 399/90 |
| 2010/0067944 | A1 | 3/2010 | Watanabe | |
| 2010/0329734 | A1 | 12/2010 | Hayakawa et al. | |
| 2011/0158681 | A1 * | 6/2011 | Kikuchi | G03G 21/1846 399/111 |
| 2011/0182613 | A1 * | 7/2011 | Kamimura | G03G 15/0896 399/110 |
| 2011/0222915 | A1 * | 9/2011 | Furuhata | G03G 15/0886 141/1 |
| 2011/0268476 | A1 | 11/2011 | Nakano et al. | |
| 2012/0148289 | A1 | 6/2012 | Lee et al. | |
| 2013/0322925 | A1 * | 12/2013 | Fujii | G03G 15/0886 399/258 |
| 2014/0093273 | A1 * | 4/2014 | Hayakawa | G03G 21/1647 399/111 |
| 2016/0154341 | A1 | 6/2016 | Hamada et al. | |
| 2016/0342133 | A1 * | 11/2016 | Hiramatsu | G03G 21/1676 |
| 2017/0023878 | A1 * | 1/2017 | Uchida | G03G 21/206 |
| 2017/0153597 | A1 | 6/2017 | Sato et al. | |
| 2017/0160697 | A1 | 6/2017 | Sato et al. | |
| 2018/0004145 | A1 * | 1/2018 | Sato | B65H 31/02 |
| 2018/0373197 | A1 | 12/2018 | Sato et al. | |
| 2019/0302645 | A1 * | 10/2019 | Wang | G03G 21/1647 |
| 2019/0302681 | A1 * | 10/2019 | Wang | G03G 21/1647 |
| 2021/0063949 | A1 | 3/2021 | Sato et al. | |
| 2021/0063958 | A1 | 3/2021 | Taguchi et al. | |
| 2021/0080896 | A1 | 3/2021 | Sato et al. | |

FOREIGN PATENT DOCUMENTS

| | | | |
|---|---|---|---|
| JP | 2013-11778 | A | 1/2013 |
| JP | 2016-110097 | A | 6/2016 |
| JP | 2017-102150 | A | 6/2017 |
| JP | 2018-146886 | A | 9/2018 |
| JP | 2019-8064 | A | 1/2019 |

* cited by examiner

80

80

IMAGE FORMING DEVICE HAVING DRAWER

CROSS REFERENCE TO RELATED APPLICATION

The present application is a Continuation Application of U.S. Ser. No. 18/066,501, filed Dec. 15, 2022, now U.S. Pat. No. 12,105,456, which is a Continuation Application of U.S. Ser. No. 17/554,263, filed Dec. 17, 2021, now U.S. Pat. No. 11,556,085, which is a Continuation Application of U.S. Ser. No. 17/003,068, filed Aug. 26, 2020, now U.S. Pat. No. 11,231,674, which claims priority from Japanese Patent Application No. 2019-159904, which was filed on Sep. 2, 2019, the disclosures of which are herein incorporated by reference in their entirety.

BACKGROUND

Technical Field

The following disclosure relates to an image forming device.

Description of Related Art

An image forming device conventionally includes a housing, a drawer, and a process cartridge. The drawer is movable between an inside position at which the drawer is located inside the housing and an outside position at which the drawer is located outside the housing. The process cartridge is mountable on the drawer. The process cartridge includes a photoconductive drum and a developer roller. The process cartridge is capable of storing toner.

SUMMARY

The process cartridge of the known image forming device includes the photoconductive drum and the developer roller as described above.

When the amount of the toner remaining in the process cartridge of the known image forming device is reduced, for instance, the entirety of the process cartridge including the photoconductive drum needs to be replaced even though the photoconductive drum need not be replaced. It is thus difficult to achieve cost reduction.

Accordingly, one aspect of the present disclosure is directed to an image forming device including a drawer in which (a) a drum cartridge including a photoconductive drum and a developer roller and (b) a toner cartridge storing toner can be replaced independently of each other.

In one aspect of the present disclosure, an image forming device includes a housing; a drawer movable in a first direction from an inside position at which the drawer is located inside the housing to an outside position at which the drawer is located outside the housing via an intermediate position intermediate between the inside position and the outside position; a stopper movable between a first position at which the stopper stops the drawer from moving from the intermediate position to the outside position and a second position at which the stopper allows the drawer to move from the intermediate position to the outside position; a drum cartridge including a photoconductive drum and a developer roller and mountable on the drawer; and a toner cartridge storing toner and mountable on the drawer, wherein the toner cartridge mounted on the drawer is detachable from the drawer in a state in which the drawer is located at the intermediate position, and wherein the drum cartridge mounted on the drawer is detachable from the drawer in a state in which the drawer is located at the outside position.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

1. Image Forming Device 1

Figure 1:
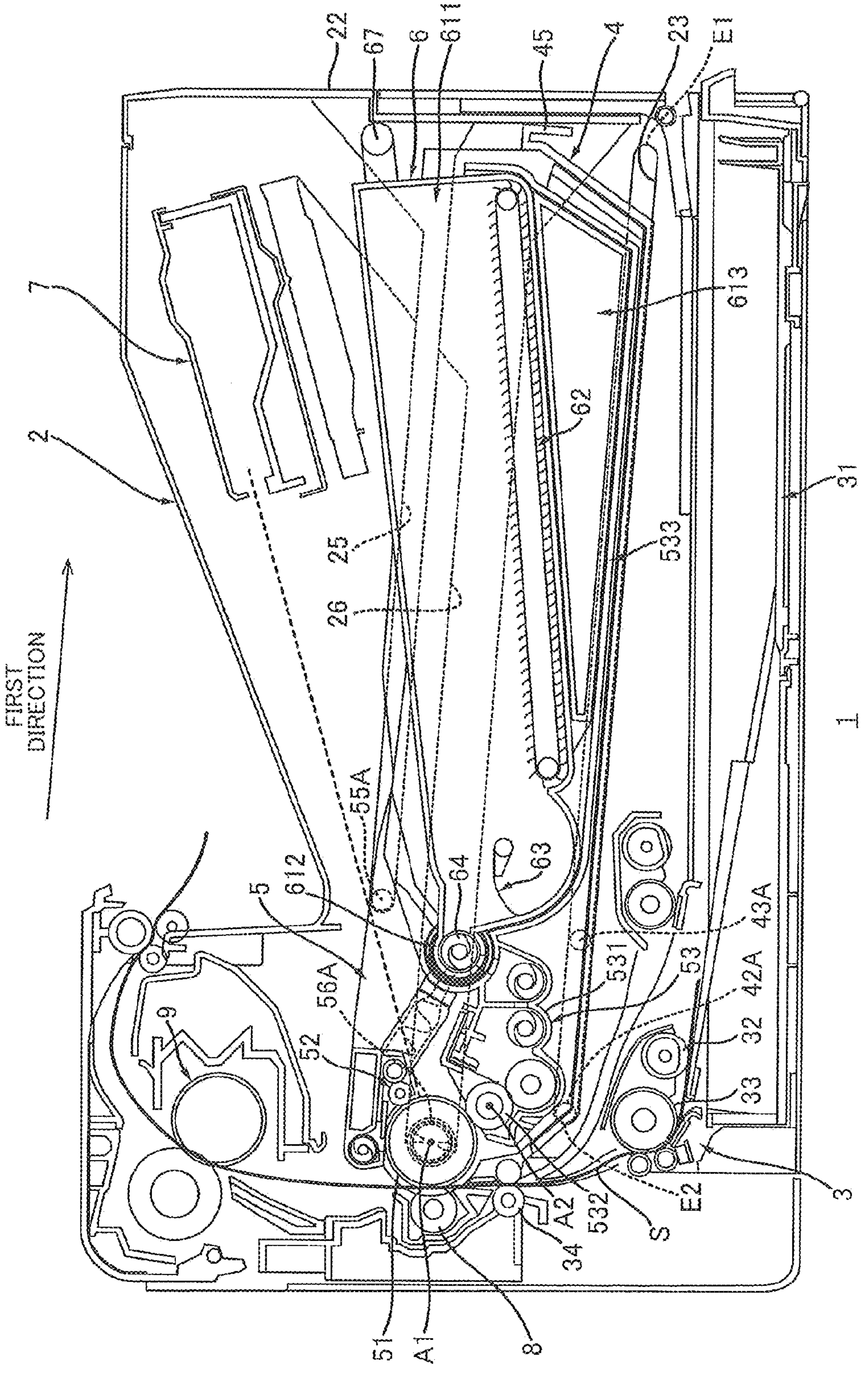
FIG. 1 is a cross-sectional view of an image forming device according to a first embodiment.
Figure 2:
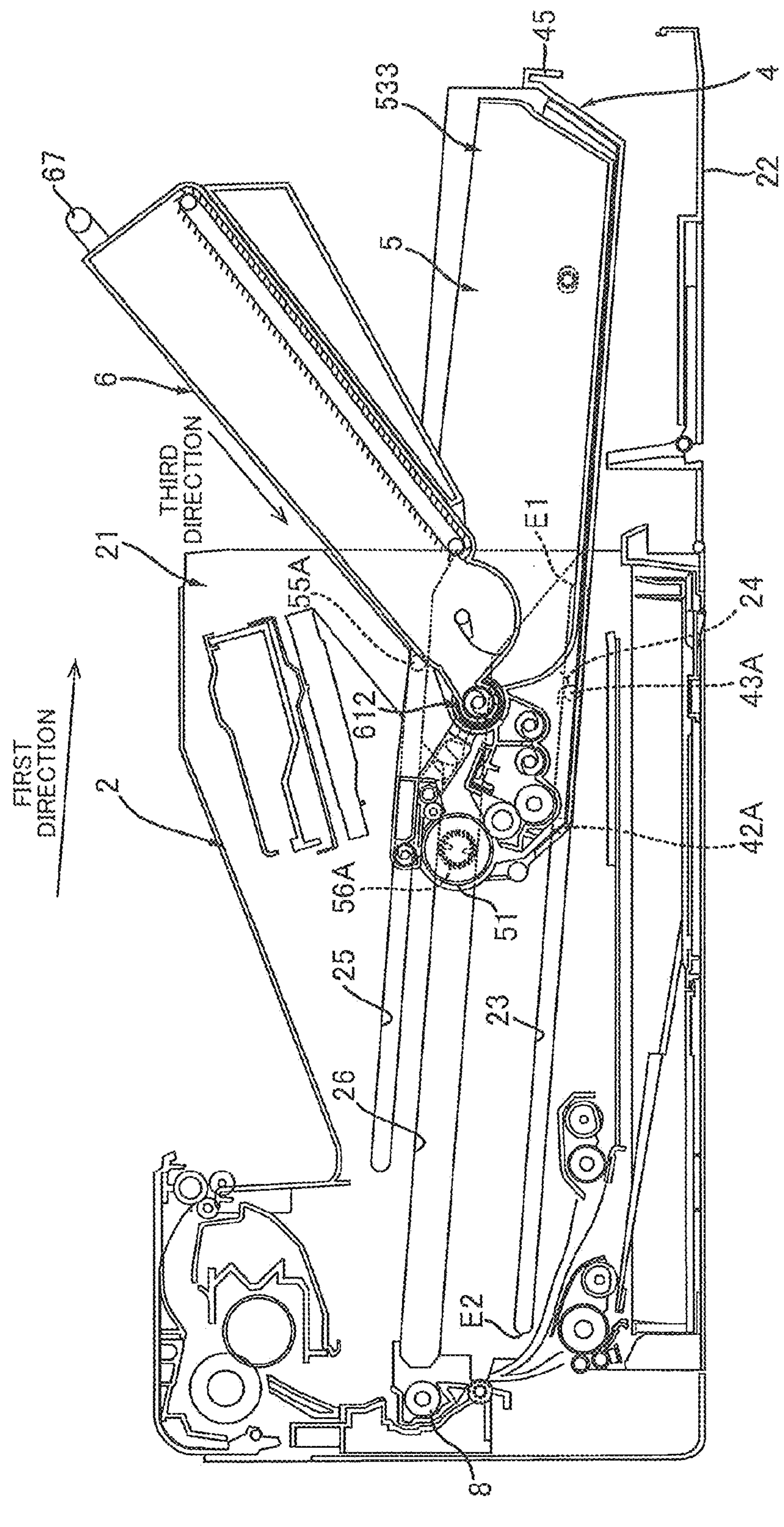
FIG. 2 illustrates the image forming device of FIG. 1 in a state in which a drawer is located at an intermediate position and a toner cartridge is located at a cartridge first position.
Figure 3:
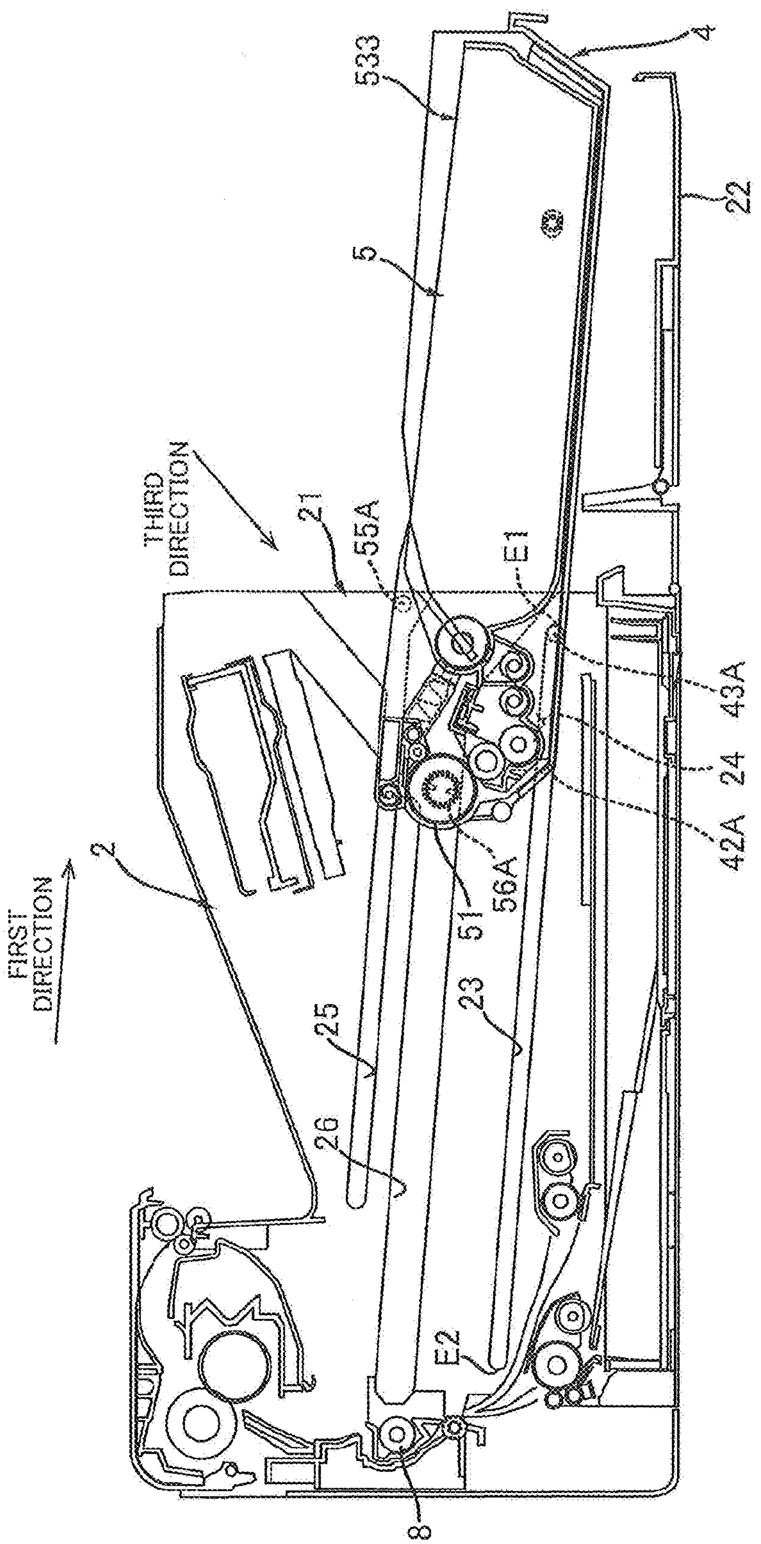
FIG. 3 illustrates the image forming device of FIG. 1 in a state in which the toner cartridge is detached from the drawer and the drawer is located at an outside position.

Referring to FIGS. 1-3, there will be explained an image forming device 1 according to a first embodiment.

As shown in FIG. 1, the image forming device 1 includes a housing 2, a sheet supplier 3, a drawer 4, a drum cartridge 5, a toner cartridge 6, an exposure device 7, a transfer roller 8, and a fixing device 9. The image forming device 1 is for monochrome printing. Thus, the image forming device 1 includes one drum cartridge 5 and one toner cartridge 6.

1.1 Housing 2

The housing 2 houses the sheet supplier 3, the drawer 4, the drum cartridge 5, the toner cartridge 6, the exposure device 7, the transfer roller 8, and the fixing device 9. As shown in FIG. 2, the housing 2 has an opening 21. The housing 2 includes a cover 22.

The cover 22 is movable between a closed position (FIG. 1) and an open position (FIG. 2). In a state in which the cover 22 is located at the closed position, the cover 22 closes the opening 21. In a state in which the cover 22 is located at the open position, the cover opens the opening 21.

1.2 Sheet Supplier 3

As shown in FIG. 1, the sheet supplier 3 is capable of supplying sheets S to a photoconductive drum 51. The photoconductive drum 51 will be later explained. The sheet supplier 3 includes a sheet cassette 31, a pickup roller 32, a conveyance roller 33, and a conveyance roller 34.

The sheet cassette 31 is capable of storing the sheets S. The pickup roller 32 picks up an uppermost one of the sheets S stacked on the sheet cassette 31 and coveys the picked-up sheet S toward the conveyance roller 33. The conveyance roller 33 conveys the sheet S conveyed from the pickup roller 32 toward the conveyance roller 34. The conveyance roller 34 conveys the sheet S conveyed from the conveyance roller 33 toward the photoconductive drum 51.

1.3 Drawer 4

As shown in FIGS. 2 and 3, in the state in which the cover 22 is located at the open position, the drawer 4 is movable in a first direction from an inside position (FIG. 1) to an outside position (FIG. 3) via an intermediate position (FIG. 2) through the opening 21. The first direction intersects an up-down direction. The drum cartridge 5 and the toner cartridge 6 can be placed on the drawer 4. The drawer 4 is movable in a state in which the drum cartridge 5 and the toner cartridge 6 are placed thereon.

As shown in FIG. 2, the housing 2 includes a drawer guide 23 configured to guide the drawer 4. The drawer guide 23 extends in the first direction. The drawer guide 23 is a groove. The drawer guide 23 may be a rib. The drawer guide 23 has a first end portion E1 and a second end portion E2. The second end portion E2 is located apart from the first end portion E1 in the first direction and is located between the first end portion E1 and the transfer roller 8 in the first direction. The drawer guide 23 inclines downward in a direction directed from the second end portion E2 toward the first end portion E1. Owing to the thus inclined drawer guide 23, the drawer 4 inclines downward in a direction directed from the inside position toward the outside position. This configuration enables the drawer 4 to be easily moved from the inside position to the outside position utilizing the weight of the drawer 4.

As shown in FIG. 1, the inside position is a position at which a guided portion 42A of the drawer 4 engages the second end portion E2 of the drawer guide 23. The guided portion 42A will be later explained. In the state in which the drawer 4 is located at the inside position, the entirety of the drawer 4 is disposed in the housing 2.

As shown in FIG. 2, the intermediate position is a position at which a guided portion 43A of the drawer 4 contacts a stopper 24 and the drawer 4 stays between the inside position and the outside position. The stopper 24 and the guided portion 43A will be later explained.

As shown in FIG. 3, the outside position is a position at which the guided portion 43A of the drawer 4 engages the first end portion E1 of the drawer guide 23. In the state in which the drawer 4 is located at the outside position, at least a part of the drawer 4 is disposed outside the housing 2.

1.4 Drum Cartridge 5

The drum cartridge 5 mounted on the drawer 4 is detachable from the drawer 4 in the state in which the drawer 4 is located at the outside position. The state in which the drum cartridge 5 is mounted on the drawer 4 refers to a state in which the drum cartridge 5 is placed at a specific position on the drawer 4. The drum cartridge 5 need not be fixed to the drawer 4 in the state in which the drum cartridge 5 is mounted on the drawer 4. It is noted that the drum cartridge 5 is mountable on the drawer 4 in the state in which the drawer 4 is located at the outside position.

As shown in FIGS. 1 and 2, the drum cartridge 5 mounted on the drawer 4 cannot be detached from the drawer 4 in the state in which the drawer 4 is located at the inside position or the intermediate position. The drum cartridge 5 cannot be mounted on the drawer 4 in the state in which the drawer 4 is located at the inside position or the intermediate position.

As shown in FIG. 1, the drum cartridge 5 includes the photoconductive drum 51, a charging roller 52, and a developer device 53.

1.4.1 Photoconductive Drum 51

The photoconductive drum 51 is rotatable about an axis A1 extending in a second direction that intersects the first direction and the up-down direction. Preferably, the second direction is orthogonal to the first direction and the up-down direction. The photoconductive drum 51 extends in the second direction and has a cylindrical shape.

1.4.2 Charging Roller 52

The charging roller 52 causes the surface of the photoconductive drum 51 to be charged. The charging roller 52 is in contact with the surface of the photoconductive drum 51. The drum cartridge 5 may include a scorotron charging device in place of the charging roller 52.

1.4.3 Developer Device 53

The developer device 53 is capable of supplying the toner to the photoconductive drum 51. Specifically, the developer device 53 includes a developer housing 531 and a developer roller 532. In other words, the drum cartridge 5 includes the developer housing 531 and the developer roller 532.

The developer housing 531 stores the toner to be supplied to the photoconductive drum 51. The developer housing 531 supports the developer roller 532.

The developer roller 532 is rotatable about an axis A2 extending in the second direction. The developer roller 532 is in contact with the photoconductive drum 51. The developer roller 532 is capable of supplying the toner in the developer housing 531 to the photoconductive drum 51.

1.5 Toner Cartridge 6

The toner cartridge 6 stores the toner to be supplied to the developer device 53.

As shown in FIG. 2, the toner cartridge 6 mounted on the drawer 4 is detachable from the drawer 4 in the state in which the drawer 4 is located at the intermediate position. The state in which the toner cartridge 6 is mounted on the drawer 4 refers to a state in which the toner cartridge 6 is placed at a specific position on the drawer 4. The toner cartridge 6 need not be fixed to the drawer 4 in the state in which the toner cartridge 6 is mounted on the drawer 4. The toner cartridge 6 may be mounted on the drawer 4 via the drum cartridge 5. In the first embodiment, the toner cartridge 6 can be mounted on the drum cartridge 5 mounted on the drawer 4. The toner cartridge 6 can be mounted on the drawer 4 in the state in which the drawer 4 is located at the intermediate position. The toner cartridge 6 and the photoconductive drum 51 are arranged in the first direction in a state in which the drum cartridge 5 and the toner cartridge 6 are mounted on the drawer 4. Specifically, in the state in which the drum cartridge 5 and the toner cartridge 6 are mounted on the drawer 4, the toner cartridge 6 is located opposite to the transfer roller 8 with respect to the photoconductive drum 51 in the first direction, in other words, the photoconductive drum 51 is located between the transfer roller 8 and the toner cartridge 6 in the first direction.

As shown in FIG. 1, the toner cartridge 6 cannot be mounted on the drawer 4 in the state in which the drawer 4 is located at the inside position. The toner cartridge 6 mounted on the drawer 4 cannot be detached from the drawer 4 in the state in which the drawer 4 is located at the inside position.

1.6 Exposure Device 7

As shown in FIG. 1, the exposure device 7 is capable of exposing the surface of the photoconductive drum 51 in the state in which the drum cartridge 5 and the toner cartridge 6 are mounted on the drawer 4 and the drawer 4 is located at the inside position. Specifically, the exposure device 7 is a laser scanning unit.

The exposure device 7 exposes the surface of the photoconductive drum 51 in the state in which the surface of the photoconductive drum 51 is charged by the charging roller 52, so that a latent image is formed on the surface of the photoconductive drum 51. The developer device 53 supplies the toner onto the surface of the photoconductive drum 51 in the state in which the latent image is formed on the surface of the photoconductive drum 51, so that a toner image is formed on the surface of the photoconductive drum 51.

1.7 Transfer Roller 8

In the state in which the drawer 4, on which the drum cartridge 5 is mounted, is located at the inside position, the transfer roller 8 is in contact with the photoconductive drum 51. The sheet S conveyed by the conveyance roller 34 passes between the transfer roller 8 and the photoconductive drum 51. In this instance, the transfer roller 8 transfers the toner image formed on the surface of the photoconductive drum 51 onto the sheet S.

1.8 Fixing Device 9

The fixing device 9 heats and pressurizes the sheet S onto which the toner image has been transferred, so as to fix the toner image on the sheet S. The sheet S that has passed through the fixing device 9 is discharged onto an upper surface of the housing 2.

2. Details of Housing 2

Referring next to FIGS. 2-4B, the housing 2 will be explained.

As shown in FIG. 2, the housing 2 includes the stopper 24, a guide 25 (as one example of a first guide), and a guide 26 (as one example of a second guide), in addition to the cover 22 and the drawer guide 23 described above. In other words, the image forming device 1 includes the stopper 24, the guide 25, and the guide 26.

2.1 Stopper 24

The stopper 24 stops the drawer 4 that moves from the inside position toward the outside position, such that the drawer 4 stays at the intermediate position. The position, the shape, and the structure of the stopper 24 are not limited to any particular ones as long as the stopper 24 enables the drawer 4 that moves from the inside position toward the outside position to stay at the intermediate position. In the first embodiment, the stopper 24 is disposed in the housing 2 and is attached to the drawer guide 23.

Figure 4A:
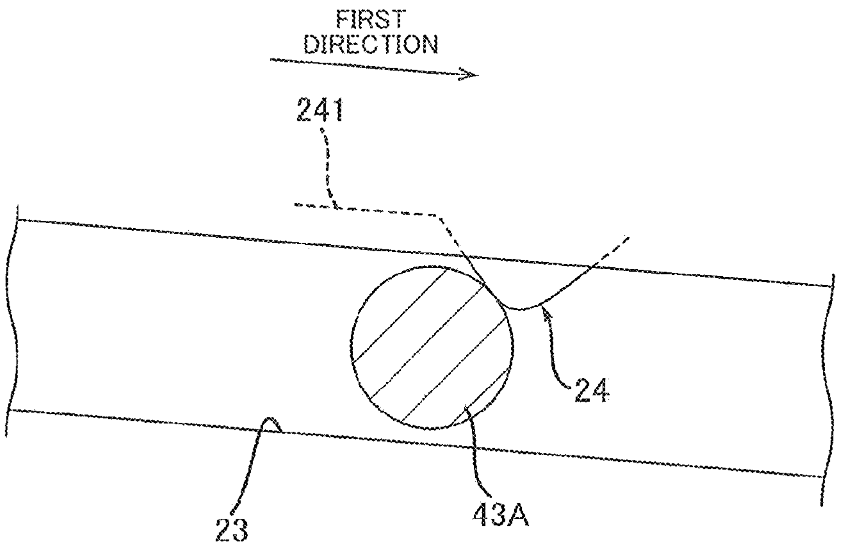
FIG. 4A is an enlarged view of a stopper illustrated in FIG. 2, the view illustrating a state in which the stopper is located at a first position.
Figure 4B:
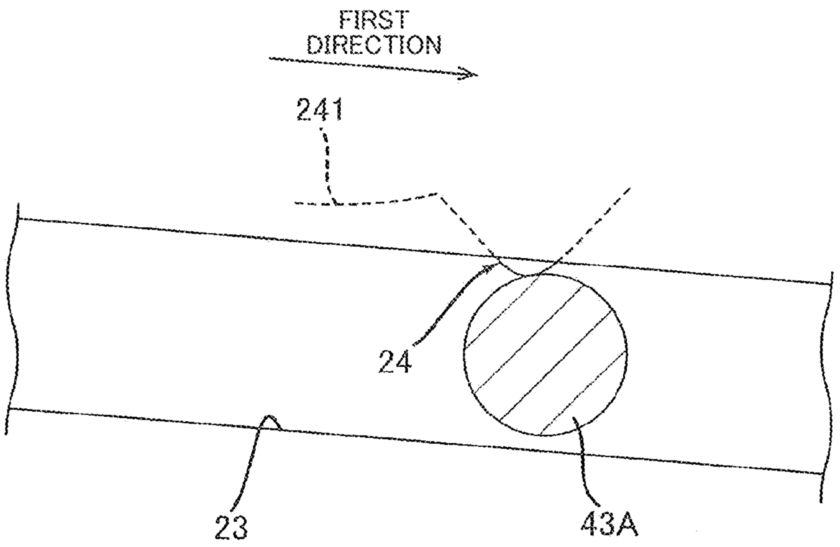
FIG. 4B is an enlarged view of the stopper illustrated in FIG. 4A, the view illustrating a state in which the stopper is located at a second position.

As shown in FIGS. 4A and 4B, the stopper 24 is movable between a first position (FIG. 4A) and a second position (FIG. 4B). The stopper 24 includes a plate spring 241. The stopper 24 is movable from the first position to the second position against a force of the plate spring 241 and is movable from the second position to the first position by the force of the plate spring 241.

When the drawer 4 moves from the inside position to the outside position in the state in which the stopper 24 is located at the first position, the stopper 24 comes into contact with the guided portion 43A of the drawer 4 in the first direction, as shown in FIG. 4A, whereby the drawer 4 stops and stays at the intermediate position, as shown in FIG. 2. In other words, the stopper 24 located at the first position contacts, in the first direction, the guided portion 43A of the drawer 4 located at the intermediate position, whereby the stopper 24 stops the drawer 4 from moving from the intermediate position to the outside position.

When the drawer 4, which is kept stayed at the intermediate position by the stopper 24, is pulled toward the outside position, the stopper 24 is pushed by the guided portion 43A as shown in FIG. 4B, so that the stopper 24 moves from the first position to the second position against the force of the plate spring 241.

In the state in which the stopper 24 is located at the second position, the stopper 24 is not in contact with the guided portion 43A of the drawer 4 in the first direction. Thus, the drawer 4 does not stop and stay at the intermediate position and moves from the intermediate position (FIG. 2) to the outside position (FIG. 3). In other words, the stopper 24 allows the drawer 4 to move from the intermediate position to the outside position when the stopper 24 is located at the second position.

2.2 Guide 25

As shown in FIG. 2, the guide 25 is disposed in the housing 2. The guide 25 is a groove extending in the first direction.

As shown in FIGS. 1 and 2, in the state in which the drum cartridge 5 is mounted on the drawer 4 and the drawer 4 is located at the inside position or the intermediate position, a guided portion 55A (as one example of a first guided portion) of the drum cartridge 5 engages the guide 25. The guided portion 55A will be later explained. When the drawer 4, on which the drum cartridge 5 is installed, moves between the inside position and the outside position, the guide 25 guides the guided portion 55A. Thus, the guide 25 guides the drum cartridge 5 in the first direction when the drawer 4, on which the drum cartridge 5 is mounted, moves between the inside position and the outside position.

2.3 Guide 26

As shown in FIG. 2, the guide 26 is disposed in the housing 2 so as to be apart from the guide 25. The guide 26 is located at a height level lower than the guide 25. The guide 26 is a groove extending in the first direction.

As shown in FIGS. 1 and 2, in the state in which the drum cartridge 5 is mounted on the drawer 4 and the drawer 4 is located at the inside position or the intermediate position, a guided portion 56A (as one example of a second guided portion) of the drum cartridge 5 engages the guide 26. The guided portion 56A will be later explained. When the drawer 4, on which the drum cartridge 5 is mounted, moves between the inside position and the outside position, the guide 26 guides the guided portion 56A. Thus, the guide 26 guides the drum cartridge 5 in the first direction, together with the guide 25 when the drawer 4, on which the drum cartridge 5 is mounted, moves between the inside position and the outside position.

3. Details of Drawer 4

Figure 5:
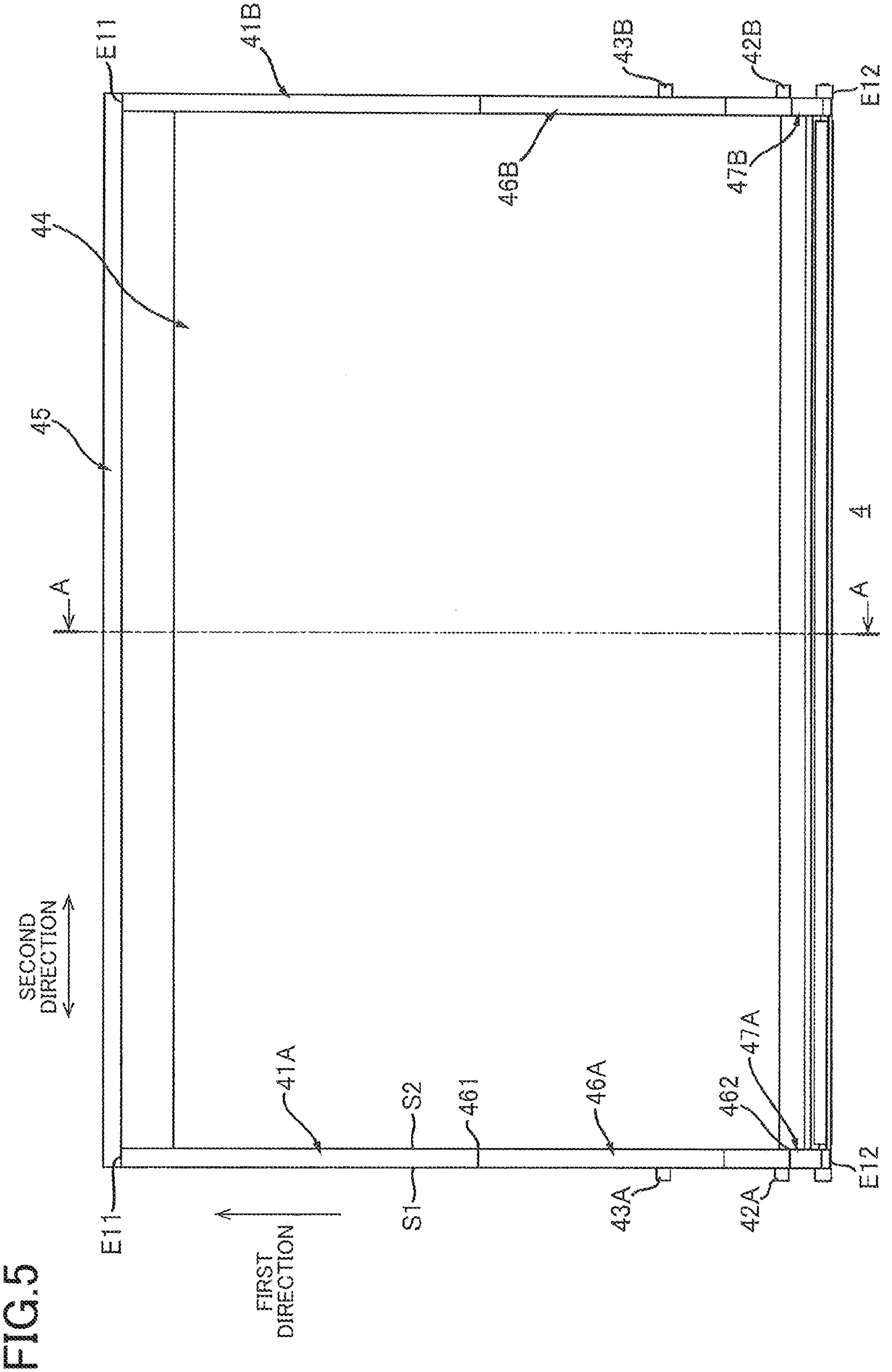
FIG. 5 is a plan view of the drawer.
Figure 6:
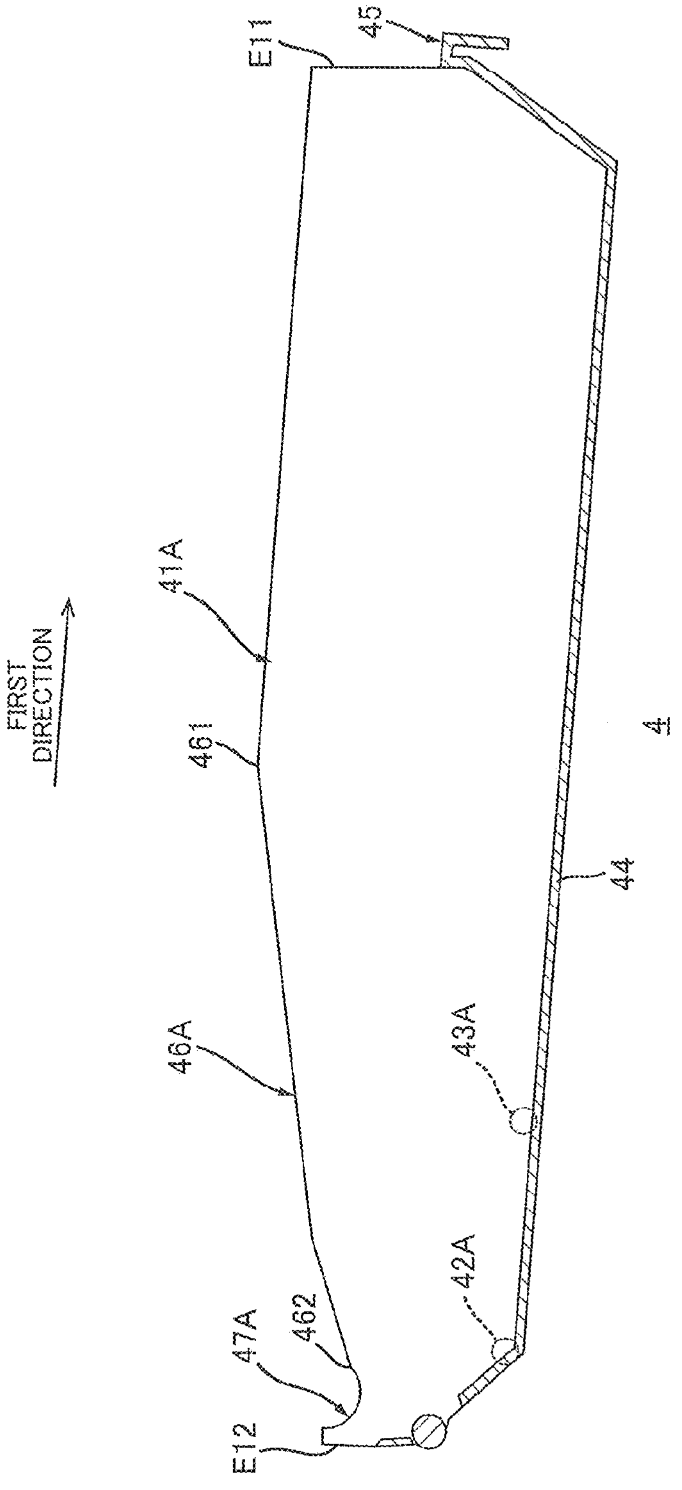
FIG. 6 is a cross-sectional view of the drawer of FIG. 5 taken along line A-A in FIG. 5.

Referring next to FIGS. 5 and 6, the drawer 4 will be explained.

As shown in FIG. 5, the drawer 4 is shaped like a tray. The drawer 4 extends in the first direction and the second direction. The drawer 4 includes a drawer side plate 41A, a drawer side plate 41B, the guided portion 42A, a guided portion 42B, the guided portion 43A, a guided portion 43B, a bottom plate 44, and a drawer grip 45.

3.1 Drawer Side Plate 41A

The drawer side plate 41A is located at a first end portion of the drawer 4 in the second direction. The drawer 4 includes the first end portion and a second end portion in the second direction. The second end portion is apart from the first end portion in the second direction. The drawer side plate 41A extends in the first direction. The drawer side plate 41A has a first end portion E11 and a second end portion E12 in the first direction. The second end portion E12 is apart from the first end portion E11 in the first direction. The drawer side plate 41A has a first surface S1 and a second surface S2 in the second direction. The second surface S2 is located between the first surface S1 and the drawer side plate 41B in the second direction.

As shown in FIGS. 5 and 6, the drawer side plate 41A includes a guide 46A and a receiving portion 47A.

3.1.1 Guide 46A

As shown in FIG. 6, the guide 46A is provided at an edge of the drawer side plate 41A. The guide 46A may be provided on the second surface S2 of the drawer side plate 41A. The guide 46A extends in the first direction and inclines with respect to the first direction. The guide 46A gets closer to the bottom plate 44 as the guide 46A gets closer to the second end portion E12. The guide 46A includes a first end portion 461 and a second end portion 462. The first end portion 461 is located between the first end portion E11 of the drawer side plate 41A and the second end portion E12 of the drawer side plate 41A in the first direction. The second end portion 462 is located between the first end portion 461 and the second end portion E12 of the drawer side plate 41A in the first direction. The guide 46A guides the guided portion 56A (FIG. 7) of the drum cartridge 5 in mounting the drum cartridge 5 on the drawer 4.

3.1.2 Receiving Portion 47A

The receiving portion 47A is located between the guide 46A and the second end portion E12 of the drawer side plate 41A in the first direction. In the state in which the drum cartridge 5 is mounted on the drawer 4 (FIG. 3), the receiving portion 47A receives the guided portion 56A (FIG. 7) of the drum cartridge 5.

3.2 Drawer Side Plate 41B

As shown in FIG. 5, the drawer side plate 41B is located at the second end portion of the drawer 4 in the second direction. The drawer side plate 41B is apart from the drawer side plate 41A in the second direction. The drawer side plate 41B includes a guide 46B and a receiving portion 47B. The above explanation of the drawer side plate 41A is true of the drawer side plate 41B.

3.3 Guided Portion 42A

The guided portion 42A is located opposite to the drawer side plate 41B with respect to the drawer side plate 41A in the second direction. The guided portion 42A is located on the first surface S1 of the drawer side plate 41A. The guided portion 42A is a protrusion extending from the first surface S1 of the drawer side plate 41A. The guided portion 42A may be attached to the first surface S1 of the drawer side plate 41A. The guided portion 42A has a cylindrical shape. The guided portion 42A engages the drawer guide 23 (FIG. 2) of the housing 2 so as to be guided by the drawer guide 23.

3.4 Guided Portion 42B

The guided portion 42B is located opposite to the drawer side plate 41A with respect to the drawer side plate 41B in the second direction. The above explanation of the guided portion 42A is true of the guided portion 42B.

3.5 Guided Portion 43A

The guided portion 43A is apart from the guided portion 42A in the first direction. The guided portion 43A is located opposite to the drawer side plate 41B with respect to the drawer side plate 41A in the second direction. The guided portion 43A is located on the first surface S1 of the drawer side plate 41A. The guided portion 43A is a protrusion extending from the first surface S1 of the drawer side plate 41A. The guided portion 43A may be attached to the first surface S1 of the drawer side plate 41A. The guided portion 43A has a cylindrical shape. The guided portion 43A engages the drawer guide 23 (FIG. 2) of the housing 2 so as to be guided by the drawer guide 23.

3.6 Guided Portion 43B

The guided portion 43B is located opposite to the drawer side plate 41A with respect to the drawer side plate 41B in the second direction. The above explanation of the guided portion 43A is true of the guided portion 43B.

3.7 Bottom Plate 44

The bottom plate 44 is located between the drawer side plate 41A and the drawer side plate 41B in the second direction so as to extend in the second direction. The bottom plate 44 is connected to the drawer side plate 41A and the drawer side plate 41B.

3.8 Drawer Grip 45

The drawer grip 45 is configured to be gripped by a user when the user moves the drawer 4 between the inside position and the outside position. The drawer grip 45 is located at an end of the drawer 4 in the first direction. The drawer grip 45 extends in the second direction. The drawer grip 45 includes a first end portion and a second end portion in the second direction. The first end portion of the drawer grip 45 is connected to the first end portion E11 of the drawer side plate 41A, and the second end portion of the drawer grip 45 is connected to the first end portion E11 of the drawer side plate 41B.

4. Details of Drum Cartridge 5

Figure 7:
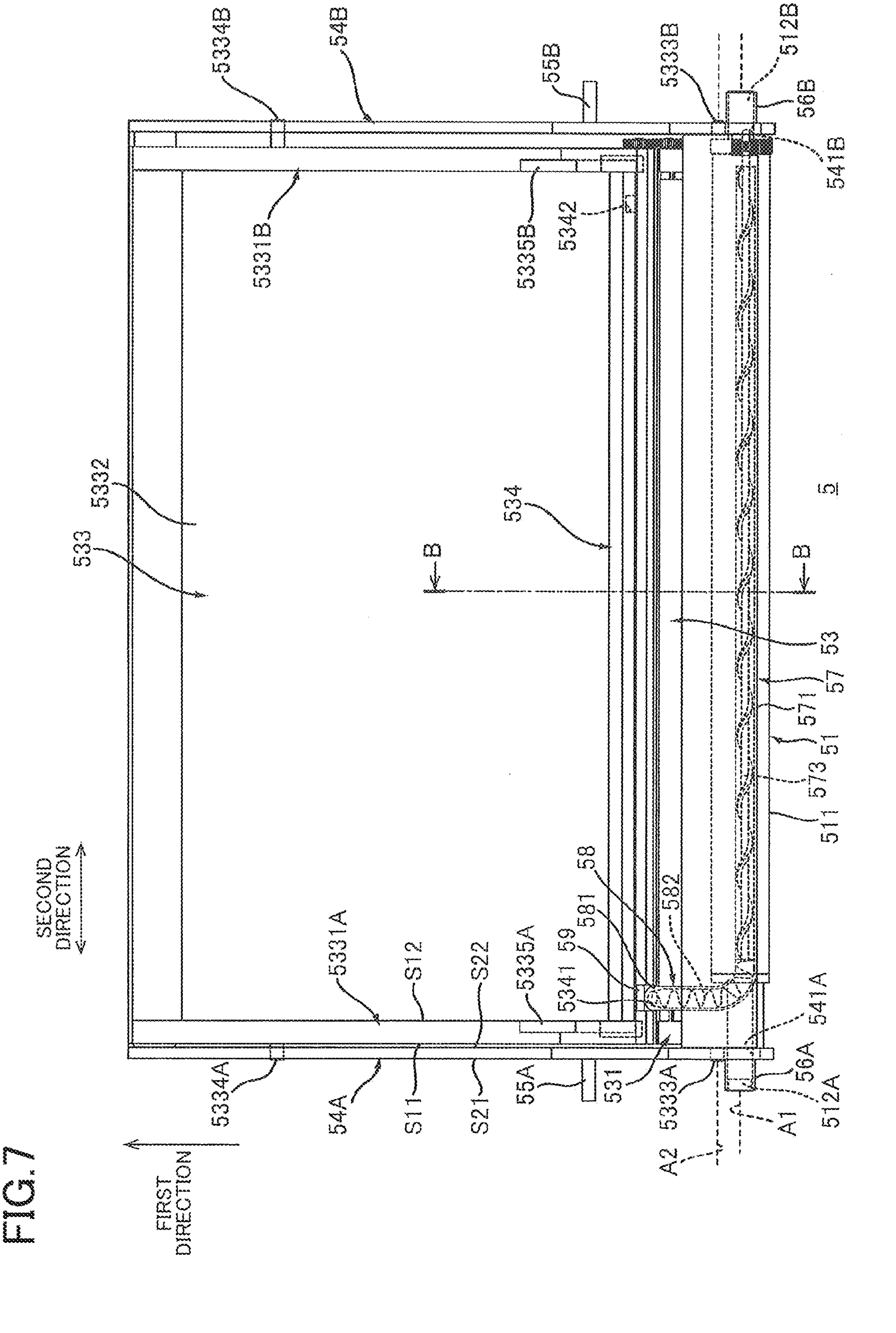
FIG. 7 is a plan view of a drum cartridge.
Figure 8A:
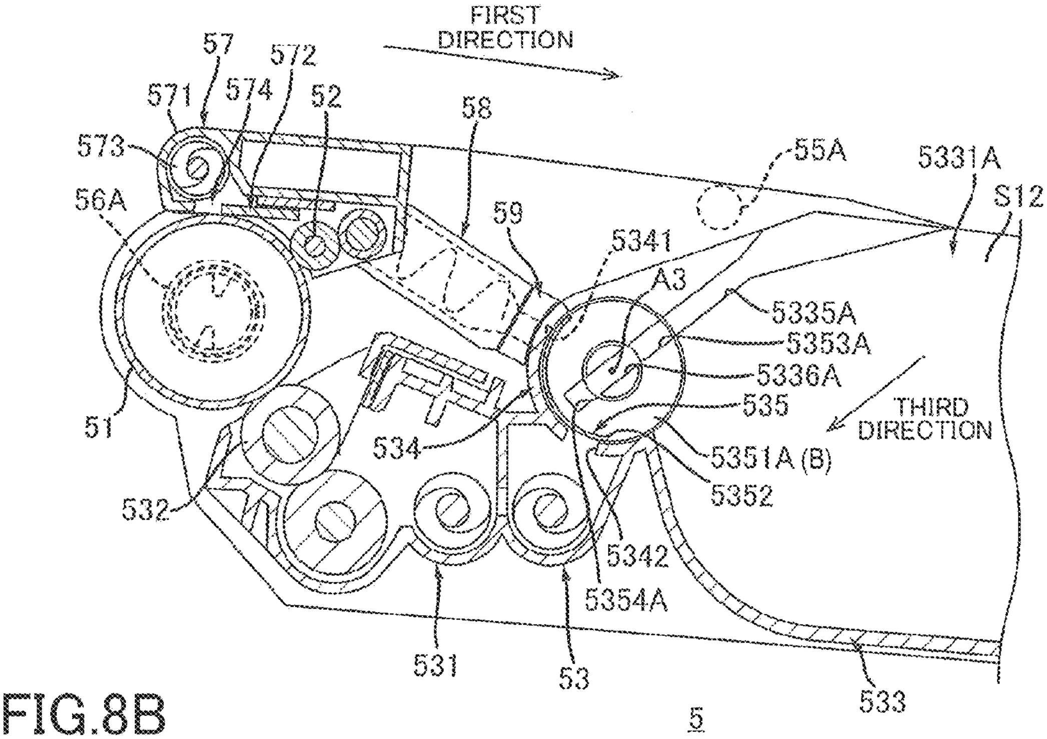
FIG. 8A is a cross-sectional view of the drum cartridge of FIG. 7 taken along line B-B in FIG. 7, the view illustrating a state in which a shutter is located at a closing position.
Figure 8B:
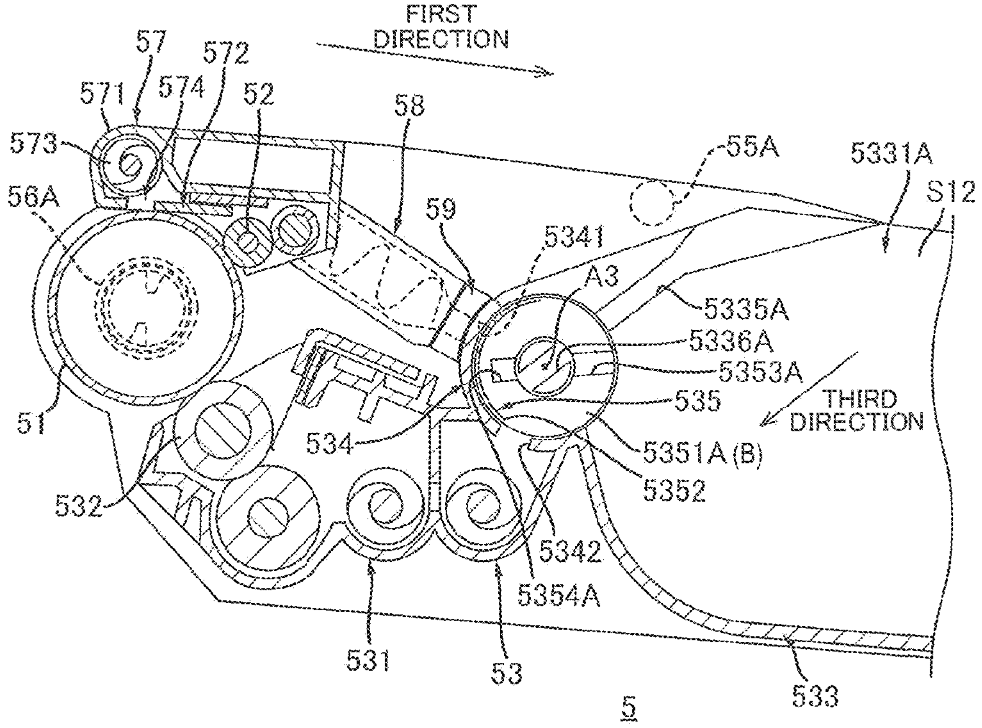
FIG. 8B illustrates a state in which the shutter of FIG. 8A is located at an open position.
Figure 9:
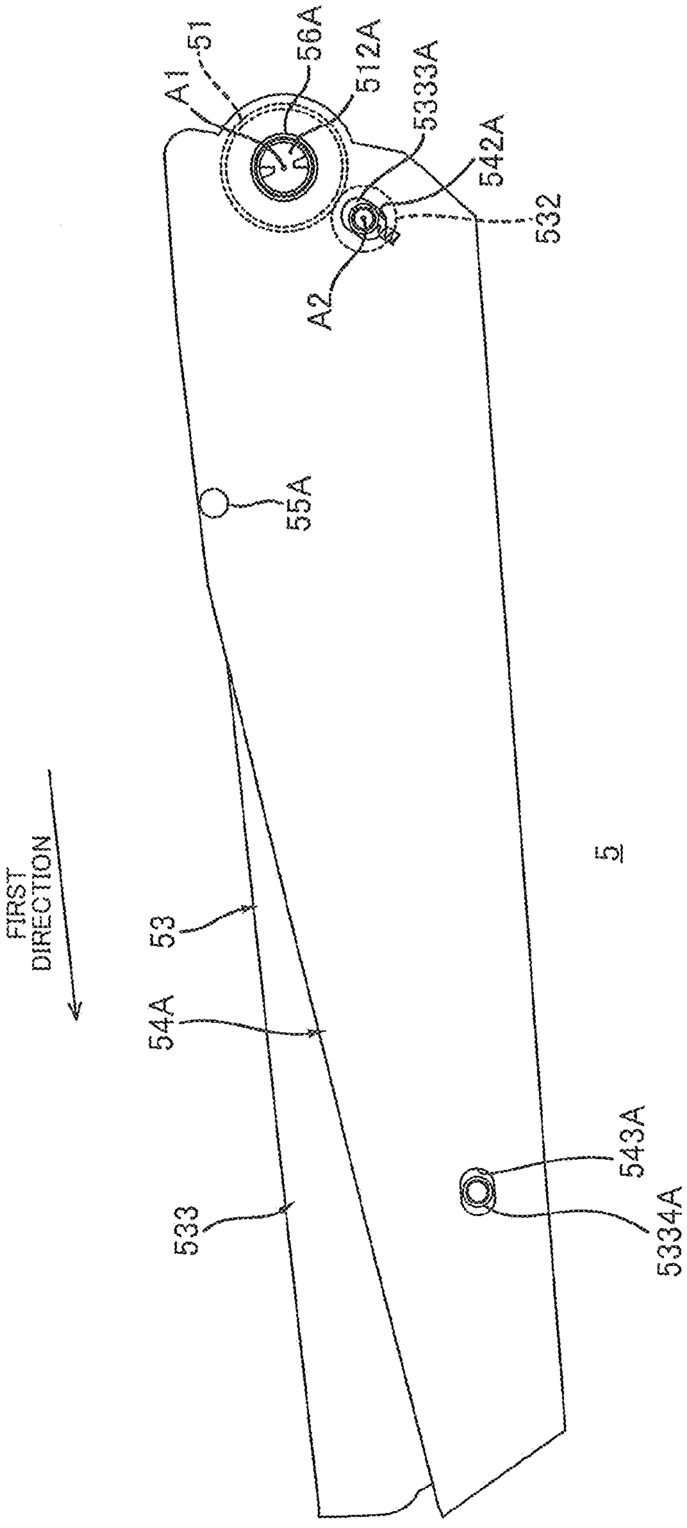
FIG. 9 is a side view of the drum cartridge of FIG. 7.

Referring next to FIGS. 7-9, the drum cartridge 5 will be explained.

As shown in FIG. 7, the drum cartridge 5 extends in the second direction. The drum cartridge 5 includes a drum cartridge side plate 54A, a drum cartridge side plate 54B, the guided portion 55A, a guided portion 55B, the guided portion 56A, a guided portion 56B, a drum cleaner 57, a waste-toner conveyor pipe 58, and a seal 59, in addition to the photoconductive drum 51, the charging roller 52 (FIG. 8A), and the developer device 53 described above.

4.1 Details of Developer Device 53

As shown in FIG. 7, the developer device 53 is located between the drum cartridge side plate 54A and the drum cartridge side plate 54B in the second direction.

As shown in FIG. 8A, the developer device 53 includes a tray 533, a connection portion 534, and a shutter 535 shown in FIG. 8A (as one example of a second shutter), in addition to the developer housing 531 and the developer roller 532 described above. In other words, the drum cartridge 5 includes the connection portion 534 and the shutter 535.

4.1.1 Tray 533

In the state in which the toner cartridge 6 is mounted on the drawer 4 (FIG. 1), the tray 533 supports the toner cartridge 6.

As shown in FIG. 7, the tray 533 includes a tray side plate 5331A, a tray side plate 5331B, a bottom plate 5332, a protrusion 5333A, a protrusion 5333B, a protrusion 5334A, and a protrusion 5334B.

4.1.1.1 Tray Side Plate 5331A

The tray side plate 5331A is located at a first end portion of the tray 533 in the second direction. The tray 533 includes the first end portion and a second end portion in the second direction. The first end portion is apart from the second end portion. The tray side plate 5331A is located between the drum cartridge side plate 54A and the tray side plate 5331B in the second direction. The tray side plate 5331A extends in a direction intersecting the axis A1, preferably, in a direction orthogonal to the axis A1. The tray side plate 5331A includes a first surface S11 and a second surface S12 in the second direction. The second surface S12 is located between the first surface S11 and the tray side plate 5331B in the second direction.

As shown in FIG. 8A, the tray side plate 5331A has a guide 5335A (as one example of a third guide) and a groove 5336A. In other words, the drum cartridge 5 has the guide 5335A.

The guide 5335A is provided on the second surface S12 of the tray side plate 5331A. The guide 5335A is located opposite to the photoconductive drum 51 with respect to the connection portion 534 in the first direction. In mounting the toner cartridge 6 on the drawer 4 in the state in which the drum cartridge 5 is mounted on the drawer 4, a guided portion 66A (FIG. 10) of the toner cartridge 6 engages the guide 5335A. The guided portion 66A will be later explained. In mounting the toner cartridge 6 on the drawer 4 in the state in which the drum cartridge 5 is mounted on the drawer 4, the guide 5335A guides the guided portion 66A toward the connection portion 534. Thus, the guide 5335A guides a toner supply portion 612 (FIG. 10) of the toner cartridge 6 toward the connection portion 534 in mounting the toner cartridge 6 on the drawer 4 in the state in which the drum cartridge 5 is mounted on the drawer 4. The toner supply portion 612 will be later explained. The guide 5335A extends in a third direction that intersects the first direction and the second direction. Preferably, the third direction intersects the first direction and is orthogonal to the second direction. Specifically, the third direction is a direction directed downward toward the housing 2 in the state in which the drum cartridge 5 is mounted on the drawer 4 and the drawer 4 is located at the outside position (FIG. 3). The guide 5335A is a groove.

The groove 5336A is located between the guide 5335A and the connection portion 534 in the third direction. The groove 5336A is apart from the guide 5335A in the third direction and extends in the third direction. In the state in which the drum cartridge 5 and the toner cartridge 6 are mounted on the drawer 4, the guided portion 66A (FIG. 10) of the toner cartridge 6 engages the groove 5336A.

4.1.1.2 Tray Side Plate 5331B

As shown in FIG. 7, the tray side plate 5331B is apart from the tray side plate 5331A in the second direction. The tray side plate 5331B is located at the second end portion of the tray 533 in the second direction. The above explanation of the tray side plate 5331A is true of the tray side plate 5331B.

4.1.1.3 Bottom Plate 5332

The bottom plate 5332 is located between the tray side plate 5331A and the tray side plate 5331B in the second direction. The bottom plate 5332 extends in the second direction. The bottom plate 5332 is connected to the tray side plate 5331A and the tray side plate 5331B.

4.1.1.4 Protrusion 5333A

The protrusion 5333A is located opposite to the protrusion 5333B with respect to the developer housing 531 in the second direction. The protrusion 5333A is located on an outer surface of the developer housing 531 in the second direction. The protrusion 5333A extends in the second direction. The protrusion 5333A extends along the axis A2. The protrusion 5333A has a cylindrical shape. The protrusion 5333A may be attached to an end of a shaft of the developer roller 532.

4.1.1.5 Protrusion 5333B

The protrusion 5333B is located opposite to the protrusion 5333A with respect to the developer housing 531 in the second direction. The explanation of the protrusion 5333A is true of the protrusion 5333B.

4.1.1.6 Protrusion 5334A

The protrusion 5334A is apart from the protrusion 5333A in the first direction. The protrusion 5334A is located opposite to the tray side plate 5331B with respect to the tray side plate 5331A in the second direction. The protrusion 5334A is located on the first surface S11 of the tray side plate 5331A. The protrusion 5334A extends from the first surface S11 of the tray side plate 5331A. The protrusion 5334A may be attached to the first surface S11 of the tray side plate 5331A. The protrusion 5334A extends in the second direction. The protrusion 5334A has a cylindrical shape.

4.1.1.7 Protrusion 5334B

The protrusion 5334B is located opposite to the tray side plate 5331A with respect to the tray side plate 5331B in the second direction. The above explanation of the protrusion 5334A is true of the protrusion 5334B.

4.1.2 Connection Portion 534

As shown in FIG. 8A, the connection portion 534 is located on the developer housing 531 in the state in which the drum cartridge 5 is mounted on the drawer 4. In the state in which the drum cartridge 5 and the toner cartridge 6 are mounted on the drawer 4, the connection portion 534 is connected to the toner supply portion 612 (FIG. 11A) and a waste-toner inlet portion 614 (FIG. 13) of the toner cartridge 6. The connection portion 534 is located between the guide 5335A and the developer housing 531. The connection portion 534 is located between the guided portion 55A and the photoconductive drum 51 in the first direction.

As shown in FIG. 7, the connection portion 534 is located between the tray side plate 5331A and the tray side plate 5331B in the second direction. The connection portion 534 extends in the second direction. The connection portion 534 includes a first end portion and a second end portion in the second direction. The second end portion is located apart from the first end portion in the second direction. The first end portion of the connection portion 534 in the second direction is connected to the tray side plate 5331A, and the second end portion of the connection portion 534 in the second direction is connected to the tray side plate 5331B. The connection portion 534 has a semi-cylindrical shape. The connection portion 534 has a waste-toner discharge opening 5341 and an inlet opening 5342. In other words, the drum cartridge 5 has the waste-toner discharge opening 5341 and the inlet opening 5342.

The waste-toner discharge opening 5341 is located at the first end portion of the connection portion 534 in the second direction. The toner conveyed by the waste-toner conveyor pipe 58 can be discharged through the waste-toner discharge opening 5341. The waste-toner discharge opening 5341 communicates with an inner space of the waste-toner conveyor pipe 58.

The inlet opening 5342 is located at the second end portion of the connection portion 534 in the second direction. In the state in which the drum cartridge 5 and the toner cartridge 6 are mounted on the drawer 4, the toner discharged from a discharge opening 617 (FIG. 11B) of the toner cartridge 6 can be received by the inlet opening 5342. The discharge opening 617 will be later explained.

As shown in FIG. 8A, the inlet opening 5342 communicates with an inner space of the developer housing 531.

4.1.3 Shutter 535

As shown in FIGS. 8A and 8B, the shutter 535 is movable between a closing position (FIG. 8A) and an open position (FIG. 8B) with respect to the inlet opening 5342 and the waste-toner discharge opening 5341. The shutter 535 is rotatable between the closing position and the open position about an axis A3.

As shown in FIG. 8A, when the shutter 535 is located at the closing position, the shutter 535 closes the inlet opening 5342 and the waste-toner discharge opening 5341.

On the other hand, when the shutter 535 is located at the open position as shown in FIG. 8B, the shutter 535 opens the inlet opening 5342 and the waste-toner discharge opening 5341.

As shown in 8A, the shutter 535 includes a shutter end plate 5351A, a shutter end plate 5351B, and a shutter body 5352. The shutter end plate 5351B is not illustrated.

4.1.3.1 Shutter End Plate 5351A

The shutter end plate 5351A is located at a first end portion of the shutter 535 in the second direction. The shutter 535 extends in the second direction. The shutter 535 includes the first end portion and a second end portion in the second direction. The second end portion is apart from the first end portion in the second direction. The shutter end plate 5351A is located on the second surface S12 of the tray side plate 5331A of the tray 533. The shutter end plate 5351A is a circular plate and has a groove 5353A and a groove 5354A.

The groove 5353A extends in a radial direction of the shutter end plate 5351A. In a state in which the shutter 535 is located at the closing position, the groove 5353A is located between the guide 5335A and the groove 5336A and extends in the third direction. In the state in which the shutter 535 is located at the closing position, the groove 5353A is connected to the guide 5335A and the groove 5336A. As shown in FIG. 8B, the groove 5353A extends in a direction different from the third direction in a state in which the shutter 535 is located at the open position.

As shown in FIG. 8A, the groove 5354A extends in the radial direction of the shutter end plate 5351A. The groove 5354A is apart from the groove 5353A in the radial direction of the shutter end plate 5351A. In the state in which the shutter 535 is located at the closing position, the groove 5354A is located opposite to the groove 5353A with respect to the groove 5336A. In the state in which the shutter 535 is located at the closing position, the groove 5354A extends in the third direction and is connected to the groove 5336A. As shown in FIG. 8B, the groove 5354A extends in a direction different from the third direction in the state in which the shutter 535 is located at the open position.

4.1.3.2 Shutter End Plate 5351B

The shutter end plate 5351B is apart from the shutter end plate 5351A in the second direction. The shutter end plate 5351B is located at the second end portion of the shutter 535 in the second direction. The above explanation of the shutter end plate 5351A is true of the shutter end plate 5351B.

4.1.3.3 Shutter Body 5352

In the state in which the shutter 535 is located at the closing position, the shutter body 5352 closes the waste-toner discharge opening 5341 and the inlet opening 5342. The shutter body 5352 is located between the shutter end plate 5351A and the shutter end plate 5351B in the second direction. The shutter body 5352 extends in the second direction. The shutter body 5352 includes a first end portion and a second end portion in the second direction. The second end portion is apart from the first end portion in the second direction. The first end portion of the shutter body 5352 in the second direction is connected to the shutter end plate 5351A, and the second end portion of the shutter body 5352 in the second direction is connected to the shutter end plate 5351B.

4.2 Drum Cartridge Side Plate 54A

As shown in FIG. 7, the drum cartridge side plate 54A is located at the first end portion of the drum cartridge 5 in the second direction. The drum cartridge 5 includes the first end portion and a second end portion in the second direction. The second end portion is apart from the first end portion in the second direction. The drum cartridge side plate 54A extends in a direction intersecting the axis A1, preferably, in a direction orthogonal to the axis A1. The drum cartridge side plate 54A has a first surface S21 and a second surface S22 in the second direction. The second surface S22 is located between the first surface S21 and the drum cartridge side plate 54B in the second direction. The drum cartridge side plate 54A has an aperture 541A, an aperture 542A (FIG. 9), and an aperture 543A (FIG. 9).

4.2.1 Aperture 541A

The aperture 541A is a through-hole. One end of the photoconductive drum 51 engages the aperture 541A.

Specifically, the photoconductive drum 51 includes a drum body 511, a flange 512A, and a flange 512B. The drum body 511 extends in the second direction and has a cylindrical shape. The drum body 511 includes a first end portion in the second direction and a second end portion that is apart from the first end portion in the second direction. The flange 512A is located at the first end portion of the drum body 511. The flange 512A is attached to the first end portion of the drum body 511 so as to extend in the second direction. The flange 512A has a cylindrical shape. The flange 512B is located at the second end portion of the drum body 511. The flange 512B is attached to the second end portion of the drum body 511. The flange 512B extends in the second direction. The flange 512B has a cylindrical shape. The flange 512A engages the aperture 541A.

4.2.2 Aperture 542A

As shown in FIG. 9, the aperture 542A is an elongate aperture and extends in a direction directed from the axis A2 toward the axis A1. The protrusion 5333A engages the aperture 542A. The aperture 542A guides the protrusion 5333A in the direction directed from the axis A2 toward the axis A1.

4.2.3 Aperture 543A

The aperture 543A is an elongate aperture and extends in the first direction. The protrusion 5334A engages the aperture 543A. The protrusion 5333A engages the aperture 542A, and the protrusion 5334A engages the aperture 543A, so that the developer device 53 is supported by the drum cartridge side plate 54A.

4.3 Drum Cartridge Side Plate 54B

As shown in FIG. 7, the drum cartridge side plate 54B is apart from the drum cartridge side plate 54A in the second direction. The drum cartridge side plate 54B is located at the second end portion of the drawer 4 in the second direction. The above explanation of the drum cartridge side plate 54A is true of the drum cartridge side plate 54B (i.e. the drum cartridge side plate 54B includes the aperture 541B, the guide 5335B, etc.).

4.4 Guided Portion 55A

The guided portion 55A is located opposite to the drum cartridge side plate 54B with respect to the drum cartridge side plate 54A in the second direction. The guided portion 55A is located on the first surface S21 of the drum cartridge side plate 54A. The guided portion 55A is a protrusion. The guided portion 55A extends from the first surface S21 of the drum cartridge side plate 54A. The guided portion 55A may be attached to the first surface S21 of the drum cartridge side plate 54A. The guided portion 55A extends in the second direction and has a cylindrical columnar shape.

As shown in FIGS. 1-3, when the drawer 4 moves between the inside position and the outside position in the state in which the drum cartridge 5 is mounted on the drawer 4, the guided portion 55A is guided by the guide 25 of the housing 2.

As shown in FIGS. 1 and 2, in the state in which the drawer 4, on which the drum cartridge 5 is mounted, is located at the inside position or the intermediate position, the guided portion 55A engages the guide 25 of the housing 2. In this state, the guide 25 stops the guided portion 55A from moving in a direction intersecting the first direction. Thus, the guide 25 stops the drum cartridge 5 from moving in the direction intersecting the first direction.

As shown in FIG. 3, in the state in which the drawer 4, on which the drum cartridge 5 is mounted, is located at the outside position, the guided portion 55A is disengaged from the guide 25 of the housing 2.

4.5 Guided Portion 55B

As shown in FIG. 7, the guided portion 55B is located opposite to the drum cartridge side plate 54A with respect to the drum cartridge side plate 54B in the second direction. The above explanation of the guided portion 55A is true of the guided portion 55B.

4.6 Guided Portion 56A

The guided portion 56A is located opposite to the guided portion 55A with respect to the connection portion 534 in the first direction. The guided portion 56A is located opposite to the drum cartridge side plate 54B with respect to the drum cartridge side plate 54A in the second direction. The guided portion 56A is located on the first surface S21 of the drum cartridge side plate 54A. The guided portion 56A is a protrusion. The guided portion 56A extends from the first surface S21 of the drum cartridge side plate 54A. The guided portion 56A may be attached to the first surface S21 of the drum cartridge side plate 54A. The guided portion 56A extends in the second direction. The guided portion 56A extends along the axis A1 and has a cylindrical shape.

In the first embodiment, one end of the photoconductive drum 51 in the second direction is fitted to the guided portion 56A. The flange 512A of the photoconductive drum 51 is fitted to the guided portion 56A. The guided portion 56A may be the one end of the photoconductive drum 51 in the second direction. The guided portion 56A may be the flange 512A of the photoconductive drum 51. The one end of the photoconductive drum 51 in the second direction need not be necessarily fitted to the guided portion 56A.

In mounting the drum cartridge 5 on the drawer 4, the guided portion 56A is guided by the guide 46A (FIG. 6) of the drawer 4. In the state in which the drum cartridge 5 is mounted on the drawer 4, the guided portion 56A engages the receiving portion 47A (FIG. 6) of the drawer 4.

As shown in FIGS. 1-3, when the drawer 4 moves between the inside position and the outside position in the state in which the drum cartridge 5 is mounted on the drawer 4, the guided portion 56A is guided by the guide 26 of the housing 2.

As shown in FIGS. 1 and 2, in the state in which the drawer 4, on which the drum cartridge 5 is mounted, is located at the inside position or the intermediate position, the guided portion 56A engages the guide 26 of the housing 2. In this state, the guide 26 stops the guided portion 56A from moving in the direction intersecting the first direction. Thus, the guide 26 cooperates with the guide 25 to stop the drum cartridge 5 from moving in the direction intersecting the first direction.

As shown in FIG. 3, in the state in which the drawer 4, on which the drum cartridge 5 is mounted, is located at the outside position, the guided portion 56A is disengaged from the guide 26 of the housing 2.

4.7 Guided Portion 56B

As shown in FIG. 7, the guided portion 56B is located opposite to the drum cartridge side plate 54A with respect to the drum cartridge side plate 54B in the second direction. The above explanation of the guided portion 56A is true of the guided portion 56B.

4.8 Drum Cleaner 57

The drum cleaner 57 is located between the drum cartridge side plate 54A and the drum cartridge side plate 54B in the second direction. The drum cleaner 57 extends in the second direction. The drum cleaner 57 includes a first end portion in the second direction and a second end portion that is apart from the first end portion in the second direction. The first end portion of the drum cleaner 57 is connected to the drum cartridge side plate 54A, and the second end portion of the drum cleaner 57 is connected to the drum cartridge side plate 54B. The drum cleaner 57 collects waste toner that remains on the surface of the photoconductive drum 51 without being transferred to the sheet S.

As shown in FIG. 8A, the drum cleaner 57 includes a cleaner housing 571, a cleaning blade 572, and an auger screw 573.

4.8.1 Cleaner Housing 571

As shown in FIG. 7, the cleaner housing 571 is located between the drum cartridge side plate 54A and the drum cartridge side plate 54B in the second direction. The cleaner housing 571 extends in the second direction. The cleaner housing 571 includes a first end portion and a second end portion in the second direction. The first end portion of the cleaner housing 571 is connected to the drum cartridge side plate 54A, and the second end portion of the cleaner housing 571 is connected to the drum cartridge side plate 54B.

As shown in FIG. 8A, the cleaner housing 571 has an opening 574.

4.8.2 Cleaning Blade 572

The cleaning blade 572 is attached to the cleaner housing 571. The cleaning blade 572 is in contact with the surface of the photoconductive drum 51 at its edge. When the photoconductive drum 51 rotates, the waste toner on the surface of the photoconductive drum 51 comes into contact with the edge of the cleaning blade 572 so as to be removed from the surface of the photoconductive drum 51. The thus removed waste toner is stored in the cleaner housing 571 through the opening 574.

4.8.3 Auger Screw 573

The auger screw 573 is disposed in the cleaner housing 571.

As shown in FIG. 7, the auger screw 573 extends in the second direction. The auger screw 573 conveys the waste toner in the cleaner housing 571 toward the waste-toner conveyor pipe 58.

4.9 Waste-Toner Conveyor Pipe 58

The waste-toner conveyor pipe 58 conveys the waste toner from the drum cleaner 57 to the waste-toner discharge opening 5341. Specifically, the waste-toner conveyor pipe 58 conveys the waste toner in the cleaner housing 571 to the waste-toner discharge opening 5341. The waste-toner conveyor pipe 58 includes a pipe 581 and a screw 582.

The pipe 581 includes a first end portion and a second end portion that is apart from the first end portion. The first end portion of the pipe 581 is connected to the cleaner housing 571 of the drum cleaner 57, and the second end portion of the pipe 581 is connected to the connection portion 534. An inner space of the pipe 581 communicates with an inner space of the cleaner housing 571 and the waste-toner discharge opening 5341. Thus, the waste toner in the cleaner housing 571 is discharged from the waste-toner discharge opening 5341 through the pipe 581.

The screw 582 is disposed in the pipe 581. The screw 582 conveys the waste toner in the pipe 581 toward the waste-toner discharge opening 5341. The screw 582 extends in a direction in which the pipe 581 extends. The screw 582 is connected to the auger screw 573. The screw 582 is rotatable together with the auger screw 573. Specifically, the screw 582 is a shaftless screw.

4.10 Seal 59

The seal 59 is provided between the waste-toner conveyor pipe 58 and the connection portion 534. The seal 59 seals between the waste-toner conveyor pipe 58 and the connection portion 534 so as to surround the waste-toner discharge opening 5341. This arrangement prevents leakage of the waste toner from between the waste-toner conveyor pipe 58 and the connection portion 534. The seal 59 has elasticity. Specifically, the seal 59 is a sponge.

5. Details of Toner Cartridge 6

Figure 10:
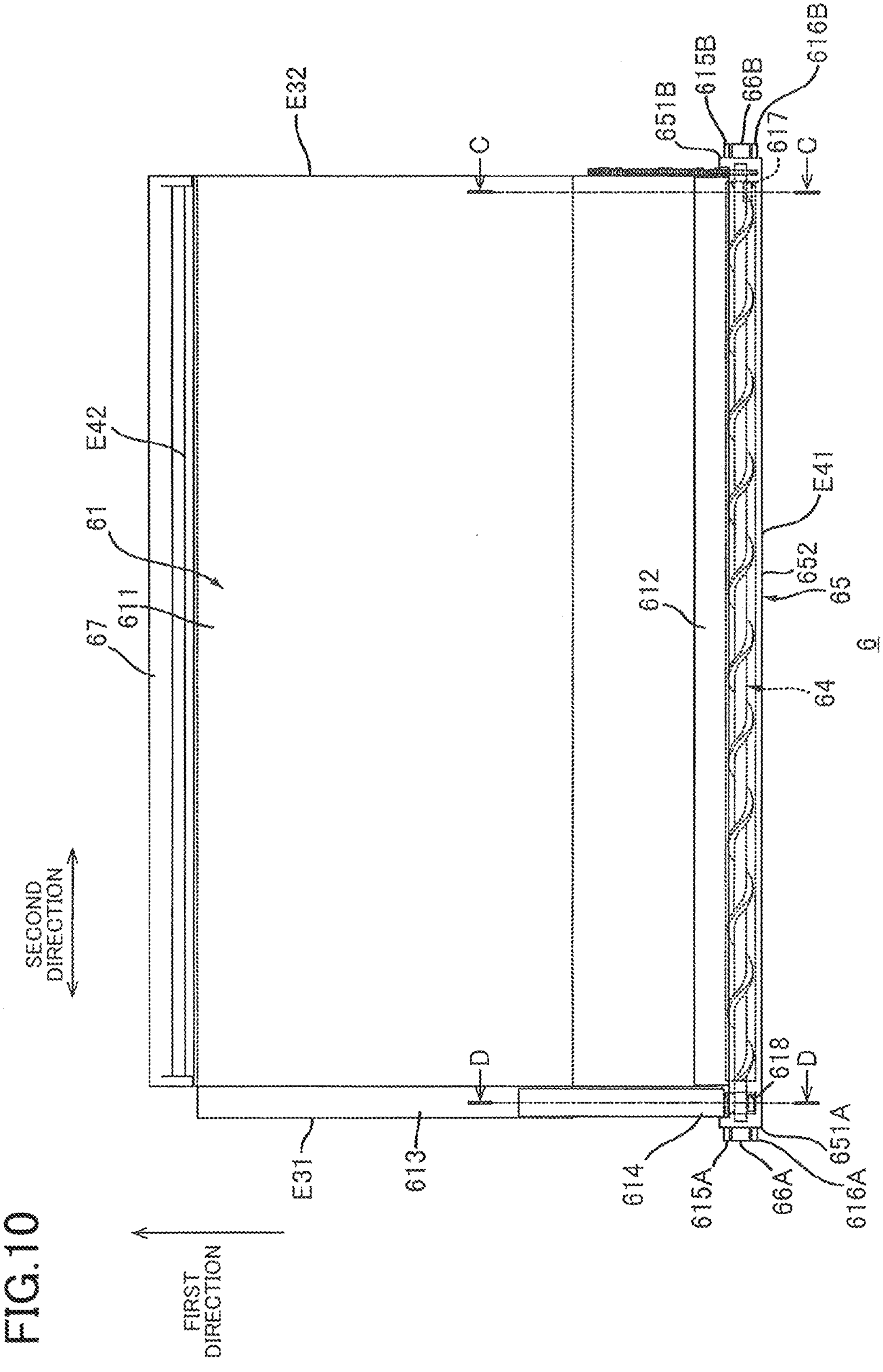
FIG. 10 is a plan view of the toner cartridge.

Referring next to FIGS. 1, 2, and 10-13, the toner cartridge 6 will be explained. As shown in FIG. 10, the toner cartridge 6 extends in the second direction. The toner cartridge 6 includes a first end portion E31 and a second end portion E32 in the second direction. The second end portion E32 is apart from the first end portion E31 in the second direction. The toner cartridge 6 extends in the first direction. The toner cartridge 6 includes a first end portion E41 and a second end portion E42 in the first direction. The second end portion E42 is apart from the first end portion E41 in the first direction. As shown in FIGS. 1 and 10, the toner cartridge 6 includes a toner cartridge housing 61, a belt conveyor 62 (FIG. 1), an agitator 63 (FIG. 1), an auger screw 64 (FIG. 1), a shutter 65 (as one example of a first shutter), the guided portion 66A, a guided portion 66B, and a toner grip 67.

5.1 Toner Cartridge Housing 61

The toner cartridge housing 61 includes a toner storage portion 611, the toner supply portion 612, a waste-toner storage portion 613, a waste-toner inlet portion 614, a protrusion 615A, a protrusion 615B, a protrusion 616A, and a protrusion 616B. In other words, the toner cartridge 6 includes the toner supply portion 612.

5.1.1 Toner Storage Portion 611

The toner storage portion 611 stores the toner.

5.1.2 Toner Supply Portion 612

The toner supply portion 612 is located at the first end portion E41 of the toner cartridge 6 in the first direction. In the state in which the drum cartridge 5 and the toner cartridge 6 are mounted on the drawer 4, the toner supply portion 612 is capable of supplying the toner to the developer device 53 (FIG. 1) of the drum cartridge 5.

Figure 11A:
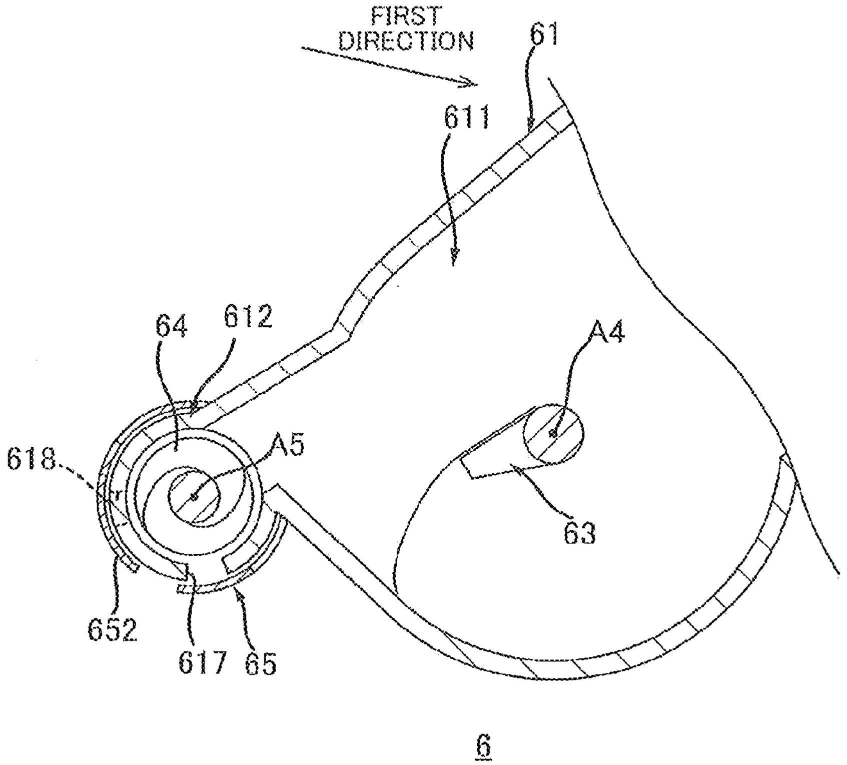
FIG. 11A is a cross-sectional view of the toner cartridge of FIG. 10 taken along line C-C in FIG. 10, the view illustrating a state in which a shutter is located at a closing position.

As shown in FIG. 11A, the toner supply portion 612 is connected to the toner storage portion 611. An inner space of the toner supply portion 612 communicates with an inner space of the toner storage portion 611. The inner space of the toner supply portion 612 does not communicate with an inner space of the waste-toner storage portion 613 (FIG. 10) and an inner space of the waste-toner inlet portion 614 (FIG. 10).

As shown in FIG. 10, the toner supply portion 612 extends in the second direction and has a cylindrical shape. The toner supply portion 612 has the discharge opening 617.

The discharge opening 617 is located at the second end portion E32 of the toner cartridge 6 in the second direction. The discharge opening 617 communicates with the inner space of the toner supply portion 612. The toner in the toner supply portion 612 can be discharged through the discharge opening 617.

5.1.3 Waste-Toner Storage Portion 613

As shown in FIG. 1, in the state in which the toner cartridge 6 and the drum cartridge 5 are mounted on the drawer 4, the waste-toner storage portion 613 is located below the toner storage portion 611. The waste-toner storage portion 613 stores the waste toner. The inner space of the waste-toner storage portion 613 does not communicate with the inner space of the toner storage portion 611 and the inner space of the toner supply portion 612.

5.1.4 Waste-Toner Inlet Portion 614

As shown in FIG. 10, the waste-toner inlet portion 614 is located at the first end portion E31 of the toner cartridge 6 in the second direction.

Figure 12:
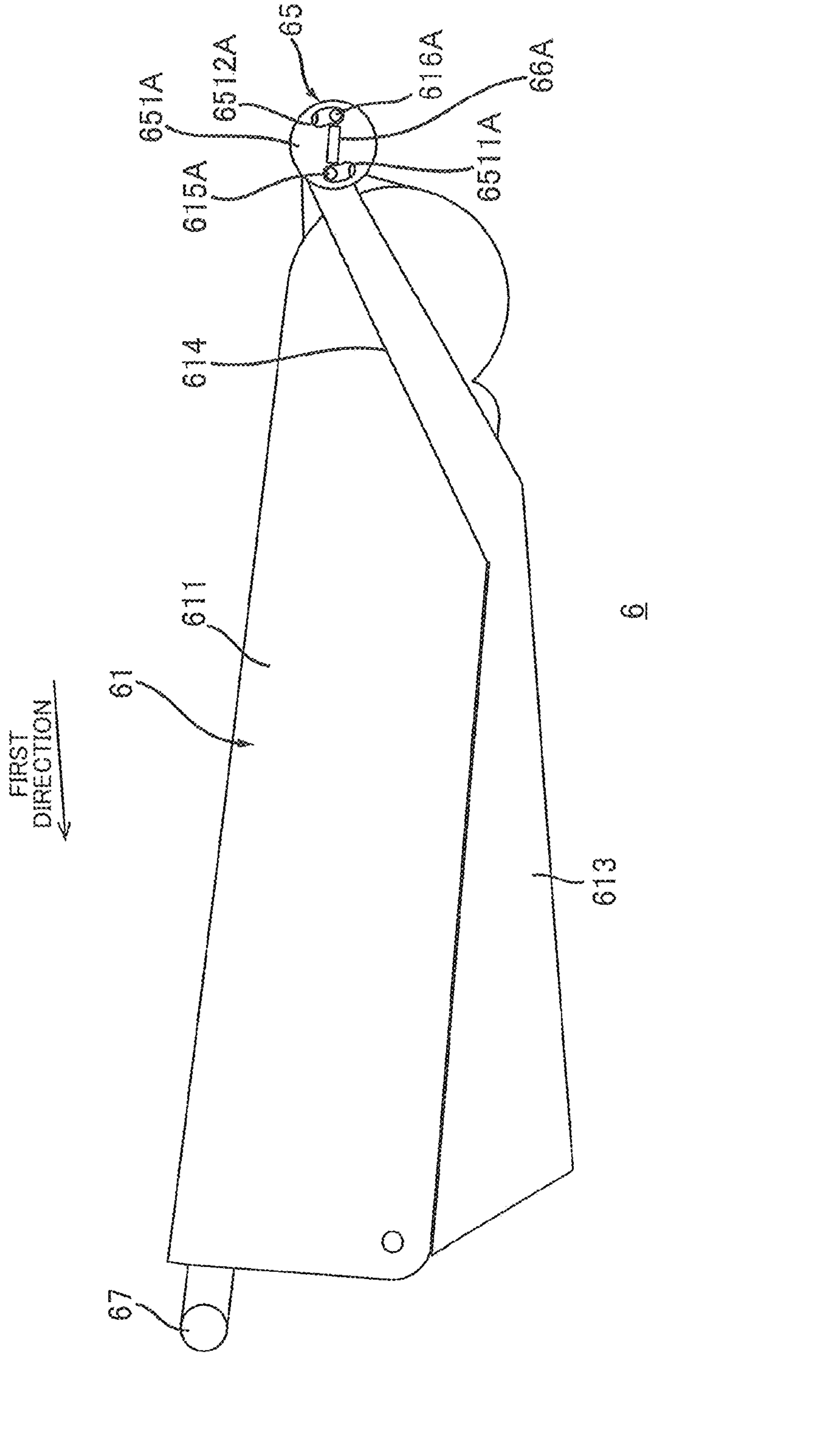
FIG. 12 is a side view of the toner cartridge of FIG. 10.
Figure 13:
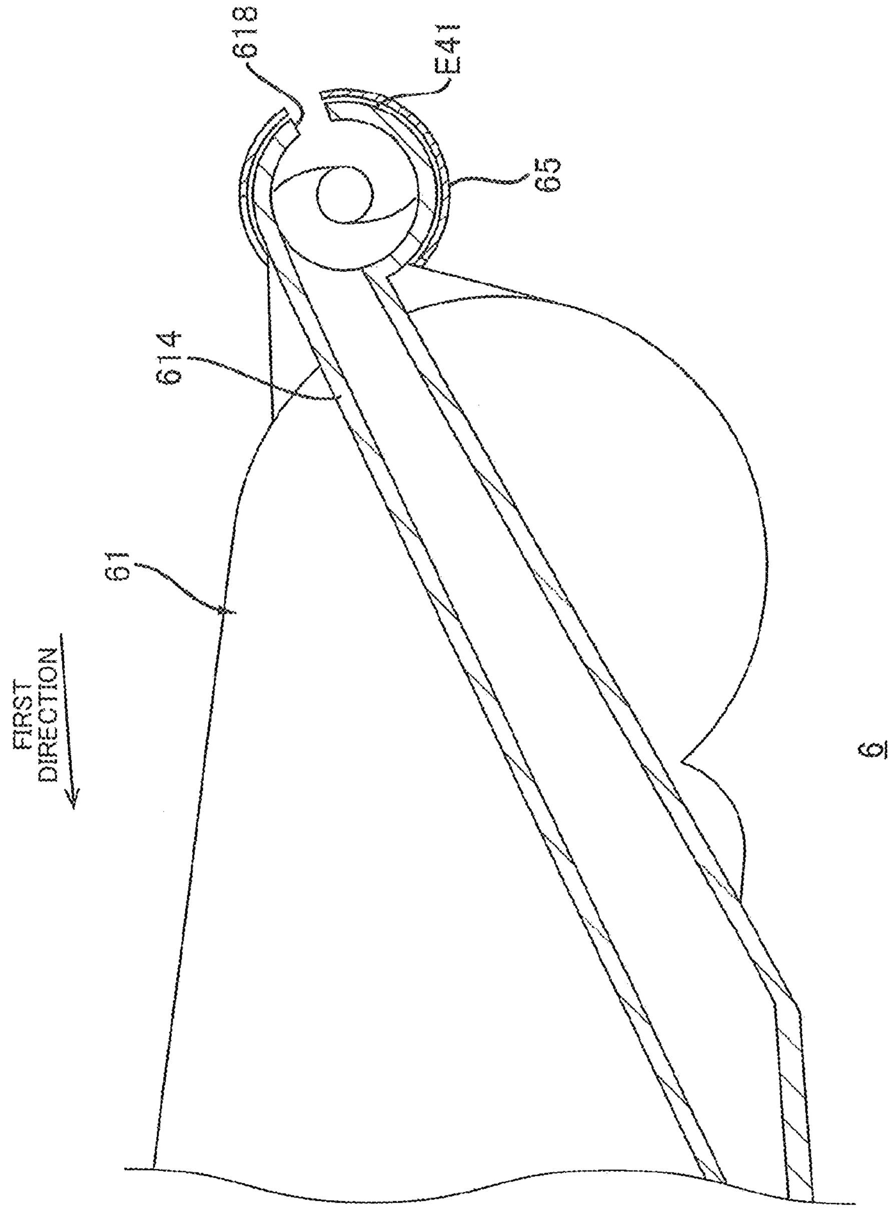
FIG. 13 is a cross-sectional view of the toner cartridge of FIG. 10 taken along line D-D in FIG. 10, the view illustrating the state in which the shutter is located at the open position.

As shown in FIGS. 12 and 13, the waste-toner inlet portion 614 is shaped like a pipe. The waste-toner inlet portion 614 includes a first end portion and a second end portion in a direction of extension thereof. The first end portion of the waste-toner inlet portion 614 is located at the first end portion E41 of the toner cartridge 6 in the first direction. The first end portion of the waste-toner inlet portion 614 is located between the guided portion 66A and the toner supply portion 612 in the second direction. The second end portion of the waste-toner inlet portion 614 is connected to the waste-toner storage portion 613.

The inner space of the waste-toner inlet portion 614 communicates with the inner space of the waste-toner storage portion 613. The inner space of the waste-toner inlet portion 614 does not communicate with the inner space of the toner storage portion 611 (FIG. 10) and the inner space of the toner supply portion 612 (FIG. 10). In the state in which the toner cartridge 6 and the drum cartridge 5 are mounted on the drawer 4, the second end portion of the waste-toner inlet portion 614 is located at a height level lower than the first end portion of the waste-toner inlet portion 614.

As shown in FIG. 10, the waste-toner inlet portion 614 has a waste-toner inlet opening 618. The waste-toner inlet opening 618 is located at the first end portion of the waste-toner inlet portion 614. The waste-toner inlet opening 618 is located at the first end portion E41 of the toner cartridge 6 in the first direction. The waste-toner inlet opening 618 is located between the guided portion 66A and the toner supply portion 612 in the second direction. The waste-toner inlet opening 618 communicates with the inner space of the waste-toner inlet portion 614.

5.1.5 Protrusion 615A

The protrusion 615A is located at the first end portion E31 of the toner cartridge 6 in the second direction. The protrusion 615A extends from the waste-toner inlet portion 614. The protrusion 615A extends in the second direction and has a cylindrical columnar shape. In the state in which the drum cartridge 5 and the toner cartridge 6 are mounted on the drawer 4, the protrusion 615A engages the groove 5353A (FIG. 8A) of the shutter 535 of the drum cartridge 5.

5.1.6 Protrusion 615B

The protrusion 615B is located at the second end portion E32 of the toner cartridge 6 in the second direction. The protrusion 615B extends from the toner supply portion 612. The above explanation of the protrusion 615A is true of the protrusion 615B.

5.1.7 Protrusion 616A

The protrusion 616A is located at the first end portion E31 of the toner cartridge 6 in the second direction. The protrusion 616A is apart from the protrusion 615A. The protrusion 616A is located opposite to the protrusion 615A with respect to the guided portion 66A. In the state in which the drum cartridge 5 and the toner cartridge 6 are mounted on the drawer 4 and the toner cartridge 6 is located at a cartridge first position (FIG. 2), the protrusion 615A and the protrusion 616A are arranged in the third direction. The cartridge first position will be later explained. In the state in which the drum cartridge 5 and the toner cartridge 6 are mounted on the drawer 4 and the toner cartridge 6 is located at a cartridge second position (FIG. 1), the protrusion 615A and the protrusion 616A are arranged in a direction different from the third direction. The cartridge second position will be later explained.

The protrusion 616A extends from the waste-toner inlet portion 614. The protrusion 616A extends in the second direction and has a columnar cylindrical shape. In the state in which the drum cartridge 5 and the toner cartridge 6 are mounted on the drawer 4, the protrusion 616A engages the groove 5354A (FIG. 8A) of the shutter 535 of the drum cartridge 5.

5.1.8 Protrusion 616B

The protrusion 616B is located at the second end portion E32 of the toner cartridge 6 in the second direction. The protrusion 616B extends from the toner supply portion 612. The above explanation of the protrusion 616A is true of the protrusion 616B.

5.2 Belt Conveyor 62

As shown in FIG. 1, the belt conveyor 62 is disposed in the toner storage portion 611. The belt conveyor 62 conveys the toner in the toner storage portion 611 toward the agitator 63.

5.3 Agitator 63

As shown in FIG. 11A, the agitator 63 is disposed in the toner storage portion 611. The agitator 63 conveys the toner in the toner storage portion 611 to the toner supply portion 612. The agitator 63 is rotatable about an axis A4. In the state in which the toner cartridge 6 and the drum cartridge 5 are mounted on the drawer 4, the axis A4 of the agitator 63 is located at a height level lower than the discharge opening 617.

5.4 Auger Screw 64

The auger screw 64 is disposed in the toner supply portion 612. As shown in FIG. 10, the auger screw 64 extends in the second direction. The auger screw 64 conveys the toner in the toner supply portion 612 toward the discharge opening 617.

5.5 Shutter 65

Figure 11B:
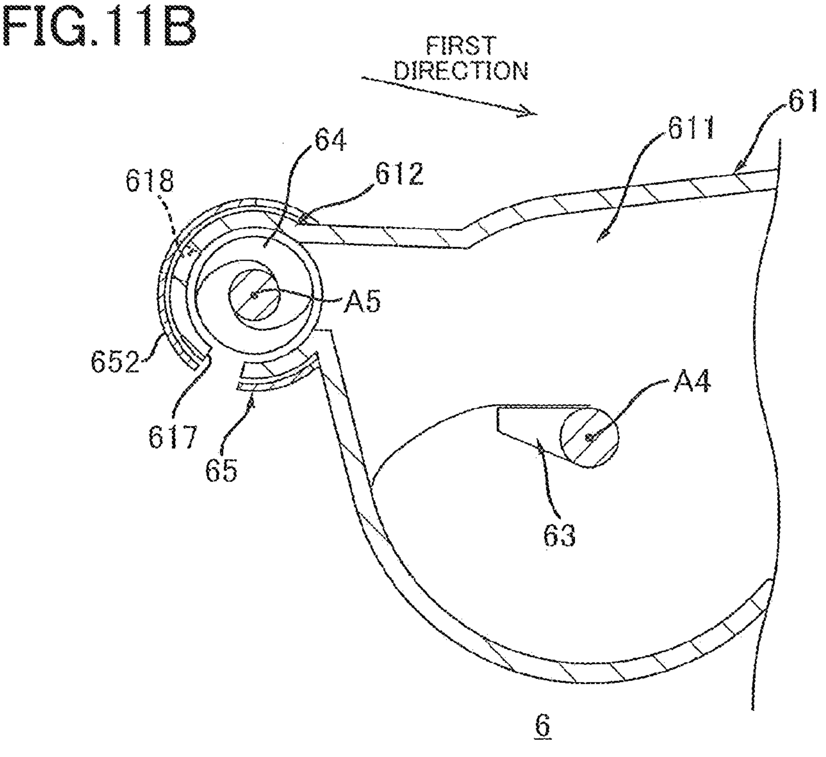
FIG. 11B illustrates a state in which the shutter of FIG. 11A is located at an open position.

As shown in FIGS. 11A and 11B, the shutter 65 is movable between a closing position (FIG. 11A) and an open position (FIG. 11B) with respect to the discharge opening 617. The shutter 65 is rotatable about an axis A5 between the closing position and the open position.

As shown in FIG. 11A, the shutter 65 closes the discharge opening 617 in the state in which the shutter 65 is located at the closing position. The shutter 65 further closes the waste-toner inlet opening 618 in the state in which the shutter 65 is located at the closing position.

As shown in FIG. 11B, the discharge opening 617 is open in the state in which the shutter 65 is located at the open position. Further, the waste-toner inlet opening 618 is open in the state in which the shutter 65 is located at the open position as shown in FIG. 13.

As shown in FIG. 10, the shutter 65 extends in the second direction. The shutter 65 includes a first end portion in the second direction and a second end portion that is apart from the first end portion in the second direction. The shutter 65 includes a shutter end plate 651A, a shutter end plate 651B, and a shutter body 652.

5.5.1 Shutter End Plate 651A

The shutter end plate 651A is located at the first end portion of the shutter 65 in the second direction. The shutter end plate 651A is located opposite to the toner supply portion 612 with respect to the first end portion of the waste-toner inlet portion 614 in the second direction. In other words, the first end portion of the waste-toner inlet portion 614 is located between the shutter end plate 651A and the toner supply portion 612 in the second direction.

As shown in FIG. 12, the shutter end plate 651A is a circular plate and has a through-hole 6511A and a through-hole 6512A.

The through-hole 6511A extends in the circumferential direction of the shutter end plate 651A. The protrusion 615A passes through the through-hole 6511A.

The through-hole 6512A is apart from the through-hole 6511A. The through-hole 6512A is located opposite to the through-hole 6511A with respect to the guided portion 66A and extends in the circumferential direction of the shutter end plate 651A. The protrusion 616A passes through the through-hole 6512A.

5.5.2 Shutter End Plate 651B

As shown in FIG. 10, the shutter end plate 651B is located at the second end portion of the shutter 65 in the second direction. The shutter end plate 651B is apart from the shutter end plate 651A in the second direction. The shutter end plate 651B is located opposite to the shutter end plate 651A with respect to the toner supply portion 612 in the second direction. In other words, the toner supply portion 612 is located between the shutter end plate 651A and the shutter end plate 651B. The above explanation of the shutter end plate 651A is true of the shutter end plate 651B.

5.5.3 Shutter Body 652

As shown in FIG. 11A, in the state in which the shutter 65 is located at the closing position, the shutter body 652 closes the discharge opening 617 and the waste-toner inlet opening 618.

As shown in FIG. 10, the shutter body 652 is located between the shutter end plate 651A and the shutter end plate 651B in the second direction. The shutter body 652 extends in the second direction. The shutter body 652 includes a first end portion in the second direction and a second end portion that is apart from the first end portion in the second direction. The first end portion of the shutter body 652 in the second direction is connected to the shutter end plate 651A, and the second end portion of the shutter body 652 in the second direction is connected to the shutter end plate 651B.

5.6 Guided Portion 66A

The guided portion 66A is located at the first end portion E31 of the toner cartridge 6 in the second direction. The guided portion 66A is a protrusion. The guided portion 66A extends from the shutter end plate 651A of the shutter 65. The guided portion 66A may be attached to the shutter end plate 651A of the shutter 65.

As shown in FIG. 12, the guided portion 66A extends in the radial direction of the shutter end plate 651A. The guided portion 66A is a rib.

When the toner cartridge 6 is mounted on the drawer 4, the guided portion 66A is guided by the guide 5335A (FIG. 8A) of the drum cartridge 5 in the state in which the shutter 65 is located at the closing position.

In the state in which the drum cartridge 5 and the toner cartridge 6 are mounted on the drawer 4 (FIG. 2), the guided portion 66A engages the groove 5336A (FIG. 8A) of the developer device 53, whereby the shutter 65 becomes unrotatable with respect to the developer device 53, in other words, the shutter 65 becomes unrotatable with respect to the connection portion 534. In the state in which the guided portion 66A is engaged in the groove 5336A, the guided portion 66A extends in the third direction.

5.7 Guided Portion 66B

As shown in FIG. 10, the guided portion 66B is apart from the guided portion 66A in the second direction. The guided portion 66B is located at the second end portion E32 of the toner cartridge 6 in the second direction. The guided portion 66B extends from the shutter end plate 651B of the shutter 65. The guided portion 66B may be attached to the shutter end plate 651B of the shutter 65. The above explanation of the guided portion 66A is true of the guided portion 66B. Thus, the guided portion 66B is not explained here.

5.8 Toner Grip 67

The toner grip 67 is located at the second end portion E42 of the toner cartridge 6 in the first direction. The toner grip 67 is located opposite to the toner supply portion 612 with respect to the toner storage portion 611 in the first direction. The toner grip 67 is configured to be gripped by the user.

As shown in FIG. 2, in the state in which the toner cartridge 6 is mounted on the drawer 4 and the drawer 4 is located at the intermediate position, the toner grip 67 is located outside the housing 2 and above the drawer grip 45. This configuration enables the toner grip 67 and the drawer grip 45 to be easily gripped in the state in which the drawer 4 is located at the intermediate position, so that the toner cartridge 6 can be smoothly detached from the drawer 4 in the state in which the drum cartridge 5 is mounted on the drawer 4.

5.9 Opening and Closing of Shutter 65 and Shutter 535

As shown in FIG. 2, in the state in which the drum cartridge 5 and the toner cartridge 6 are mounted on the drawer 4 and the drawer 4 is located at the intermediate position, the toner cartridge 6 is pivotable about the toner supply portion 612 between the cartridge first position (FIG. 2) and the cartridge second position (FIG. 1). The user can pivot the toner cartridge 6 between the cartridge first position and the cartridge second position by gripping the toner grip 67.

In the state in which the drum cartridge 5 and the toner cartridge 6 are mounted on the drawer 4, the protrusion 615A (FIG. 10) is engaged in the groove 5353A (FIG. 8A) and the protrusion 616A (FIG. 10) is engaged in the groove 5354A (FIG. 8A), whereby the shutter 535 is pivotable together with the toner cartridge housing 61.

In the state in which the drum cartridge 5 and the toner cartridge 6 are mounted on the drawer 4, the guided portion 66A (FIG. 10) is engaged in the groove 5336A (FIG. 8A), whereby the shutter 65 is unrotatable with respect to the connection portion 534.

Thus, when the toner cartridge 6 is pivoted in the state in which the drum cartridge 5 and the toner cartridge 6 are mounted on the drawer 4, the toner cartridge housing 61 pivots with respect to the shutter 65 as shown in FIGS. 11A and 11B, and the shutter 535 pivots with respect to the connection portion 534 as shown in FIGS. 8A and 8B.

In the state in which the toner cartridge 6 is located at the cartridge first position, the shutter 65 is located at the closing position at which the discharge opening 617 is closed as shown in FIG. 11A, and the shutter 535 is located at the closing position at which the inlet opening 5342 is closed as shown in FIG. 8A. That is, in the state in which the toner cartridge 6 is located at the cartridge first position, the toner cartridge 6 causes the shutter 65 to be located at the closing position and causes the shutter 535 to be located at the closing position. It is noted that the shutter 535 is located at the closing position when the shutter 65 is located at the closing position.

In the state in which the toner cartridge 6 is located at the cartridge first position, the groove 5354A, the groove 5336A, the groove 5353A, and the guide 5335A are connected in the third direction, as shown in FIG. 8A, and the protrusion 616A, the guided portion 66A, and the protrusion 615A are arranged in the third direction. In this configuration, the toner supply portion 612 of the toner cartridge 6 is disengaged from the connection portion 534 of the drum cartridge 5 in the third direction in the state in which the toner cartridge 6 is located at the cartridge first position.

In the state in which the toner cartridge 6 is located at the cartridge second position, the shutter 65 is located at the open position at which the discharge opening 617 is open as shown in FIG. 11B, and the shutter 535 is located at the open position at which the inlet opening 5342 is open as shown in FIG. 8B. That is, in the state in which the toner cartridge 6 is located at the cartridge second position, the toner cartridge 6 causes the shutter 65 to be located at the open position and causes the shutter 535 to be located at the open position. It is noted that the shutter 535 is located at the open position when the shutter 65 is located at the open position.

In the state in which the toner cartridge 6 is located at the cartridge second position, the groove 5336A and the guide 5335A extend in the third direction as shown in FIG. 8B while the groove 5354A and the groove 5353A extend in a direction different from the third direction. Thus, the groove 5354A, the groove 5336A, the groove 5353A, and the guide 5335A are not connected. In the state in which the toner cartridge 6 is located at the cartridge second position, the guided portion 66A extends in the third direction while the protrusion 616A and the protrusion 615A extend in a direction different from the third direction. In this configuration, the toner supply portion 612 of the toner cartridge 6 cannot be disengaged from the connection portion 534 of the drum cartridge 5 in the state in which the toner cartridge 6 is located at the cartridge second position.

6. Replacement of Toner Cartridge 6

Referring next to FIGS. 2, 8A, 8B, 11A, and 11B, replacement of the toner cartridge 6 will be explained.

6.1 Detachment of Toner Cartridge 6

As shown in FIG. 2, in detaching the toner cartridge 6, the user first moves the cover 22 to the open position and then moves the drawer 4, on which the drum cartridge 5 and the toner cartridge 6 are mounted, to the intermediate position.

The user then pivots the toner cartridge 6 to the cartridge first position from the cartridge second position (FIG. 1). As described above, in the state in which the drum cartridge 5 is mounted on the drawer 4 and the drawer 4 is located at the intermediate position, the drum cartridge 5 is prevented from moving in the direction intersecting the first direction owing to the guide 25 and the guide 26 of the housing 2. Thus, the drum cartridge 5 is prevented from moving in the direction that intersects the first direction following the pivotal movement of the toner cartridge 6. As a result, the user can smoothly pivot the toner cartridge 6.

When the toner cartridge 6 is located at the cartridge first position, the shutter 535 is located at the closing position at which the inlet opening 5342 is closed as shown in FIG. 8A, and the shutter 65 is located at the closing position at which the discharge opening 617 is closed as shown in FIG. 11A.

The user then withdraws the toner cartridge 6 in the third direction as shown in FIG. 2 in the state in which the toner cartridge 6 is located at the cartridge first position.

When the user withdraws the toner cartridge 6 in the third direction, the toner supply portion 612 is disengaged from the connection portion 534, so that the toner cartridge 6 is detached from the drawer 4.

6.2 Mounting of Toner Cartridge 6

In mounting the toner cartridge 6, the user connects the toner supply portion 612 to the connection portion 534 in the state in which the drum cartridge 5 is mounted on the drawer 4 and the drawer 4 is located at the intermediate position.

In this instance, the protrusion 616A (FIG. 10) is guided by the guide 5335A (FIG. 8A), the groove 5353A (FIG. 8A), and the groove 5336A (FIG. 8A) so as to engage the groove 5354A (FIG. 8A). Further, the guided portion 66A is guided by the guide 5335A and the groove 5353A so as to engage the groove 5336A. Moreover, the protrusion 615A is guided by the guide 5335A so as to engage the groove 5353A.

The user then moves the toner cartridge 6 from the cartridge first position to the cartridge second position (FIG. 1).

When the toner cartridge 6 is located at the cartridge second position, the shutter 535 is located at the open position at which the inlet opening 5342 is open as shown in FIG. 8B, and the shutter 65 is located at the open position at which the discharge opening 617 is open as shown in FIG. 11B.

Thus, mounting of the toner cartridge 6 on the drawer 4 is completed.

7. Replacement of Drum Cartridge 5

Referring next to FIG. 3, replacement of the drum cartridge 5 will be explained.

7.1 Detaching of Drum Cartridge 5

In detaching the drum cartridge 5, the user first moves the drawer 4, on which the drum cartridge 5 is mounted, from the intermediate position (FIG. 2) to the outside position as shown in FIG. 3.

When the drawer 4, on which the drum cartridge 5 is mounted, is located at the outside position, the guided portion 55A is disengaged from the guide 25 and the guided portion 56A is disengaged from the guide 26. Thus, the drum cartridge 5 becomes detachable from the drawer 4.

The user then withdraws the drum cartridge 5 from the drawer 4, so that the drum cartridge 5 is detached from the drawer 4.

7.2 Mounting of Drum Cartridge 5

In mounting the drum cartridge 5, the user places the drum cartridge 5 on the drawer 4 that is located at the outside position.

When the user places the drum cartridge 5 on the drawer 4 located at the outside position, the guided portion 56A (FIG. 7) of the drum cartridge 5 comes into contact with the guide 46A (FIG. 6) of the drawer 4.

The user then slides the drum cartridge 5 toward the housing 2.

The drum cartridge 5 slides toward the inside of the housing 2. In this instance, the guided portion 56A of the drum cartridge 5 is guided by the guide 46A.

When the guided portion 56A of the drum cartridge 5 engages the receiving portion 47A (FIG. 6), mounting of the drum cartridge 5 on the drawer 4 is completed.

8. Advantageous Effects (1) As shown in FIG. 1, the image forming device 1 includes the drawer 4, the drum cartridge 5, and the toner cartridge 6. The drum cartridge 5 includes the photoconductive drum 51 and the developer roller 532. The drum cartridge 5 is mountable on the drawer 4. The toner cartridge 6 stores the toner and is mountable on the drawer 4.

In the thus configured image forming device 1 including the drawer 4, (a) the drum cartridge 5 including the photoconductive drum 51 and the developer roller 532 and (b) the toner cartridge 6 storing the toner can be replaced independently of each other as shown in FIGS. 2 and 3.

Thus, each of the drum cartridge 5 and the toner cartridge 6 can be replaced at appropriate timing in accordance with its life.

In the image forming device 1 configured as described above, the toner cartridge 6 can be replaced in the state in which the drawer 4 is kept stopped or stays at the intermediate position as shown in FIG. 2.

This configuration shortens a distance over which the drawer 4 is pulled out, as compared with a case in which the drawer 4 is pulled to the outside position for replacement of the toner cartridge 6.

As a result, the image forming device 1 is prevented from losing its balance during replacement of the toner cartridge 6.

(2) In the image forming device 1, the drawer guide 23 inclines downward in the direction directed from the second end portion E2 toward the first end portion E1 as shown in FIG. 2.

Thus, the drawer 4 inclines downward in the direction directed from the inside position toward the outside position.

In the thus constructed image forming device 1, the drawer 4 can be easily moved from the inside position to the outside position utilizing the weight of the drawer 4.

(3) In the image forming device 1, in the state in which the drum cartridge 5 is mounted on the drawer 4 and the drawer 4 is located at the intermediate position, the guide 25 and the guide 26 stop the drum cartridge 5 from moving in the direction intersecting the first direction as shown in FIG. 2.

Thus, the drum cartridge 5 is prevented from moving, together with the toner cartridge 6, in the direction intersecting the first direction when the user replaces the toner cartridge 6 in the state in which the drawer 4 is located at the intermediate position.

Specifically, the drum cartridge 5 is prevented from pivoting together with the toner cartridge 6 when the user pivots the toner cartridge 6 between the cartridge first position (FIG. 2) and the cartridge second position (FIG. 1) in the state in which the drawer 4 is located at the intermediate position.

Thus, the toner cartridge 6 can be smoothly replaced in the state in which the drum cartridge 5 is mounted on the drawer 4.

(4) In the image forming device 1, the connection portion 534 is located between the guided portion 55A and the photoconductive drum 51 in the first direction as shown in FIG. 8A.

Thus, when the user replaces the toner cartridge 6 in the state in which the drawer 4 is located at the intermediate position as shown in FIG. 2, the guide 25 can receive a force that acts on the connection portion 534 from the toner supply portion 612 in the direction intersecting the first direction.

Specifically, when the user pivots the toner cartridge 6 between the cartridge first position (FIG. 2) and the cartridge second position (FIG. 1) in the state in which the drawer 4 is located at the intermediate position, the guide 25 can receive a torque that is applied to the connection portion 534 from the toner supply portion 612.

Thus, the drum cartridge 5 is prevented from pivoting together with the toner cartridge 6.

As a result, the toner cartridge 6 can be smoothly replaced in the state in which the drum cartridge 5 is mounted on the drawer 4.

(5) In the image forming device 1, the guided portion 56A is located opposite to the guided portion 55A with respect to the connection portion 534 in the first direction as shown in FIG. 8A.

Thus, when the user replaces the toner cartridge 6 in the state in which the drawer 4 is located at the intermediate position shown in FIG. 2, the guide 25 and the guide 26 can receive the force that acts on the connection portion 534 from the toner supply portion 612 in in the direction intersecting the first direction.

Specifically, when the user pivots the toner cartridge 6 between the cartridge first position (FIG. 2) and the cartridge second position (FIG. 1) in the state in which the drawer 4 is located at the intermediate position, the guide 25 and the guide 26 can receive the torque that is applied to the connection portion 534 from the toner supply portion 612.

Thus, the drum cartridge 5 is prevented from pivoting together with the toner cartridge 6 with higher reliability.

As a result, the toner cartridge 6 can be smoothly replaced in the state in which the drum cartridge 5 is mounted on the drawer 4.

(6) In the image forming device 1, the drum cartridge 5 includes the guide 5335A shown in FIG. 8A.

In mounting the toner cartridge 6 on the drawer 4 on which the drum cartridge 5 is mounted, the guide 5335A guides the toner supply portion 612 toward the connection portion 534 as shown in FIG. 2.

Thus, the toner supply portion 612 can be smoothly connected to the connection portion 534.

(7) In the image forming device 1, the toner grip 67 is located outside the housing 2 and above the drawer grip 45 as shown in FIG. 2 in the state in which the toner cartridge 6 is mounted on the drawer 4 and the drawer 4 is located at the intermediate position.

Thus, the toner grip 67 and the drawer grip 45 can be easily gripped in the state in which the drawer 4 is located at the intermediate position.

As a result, the toner cartridge 6 can be smoothly detached from the drawer 4 in the state in which the drum cartridge 5 is mounted on the drawer 4.

9. Second Embodiment

Referring next to FIGS. 14A-20B, there will be explained a second embodiment. The same reference numerals as used in the first embodiment will be used to identify the corresponding components in the second embodiment and explanation thereof is dispensed with.

9.1 Details of Housing 2

Figure 14A:
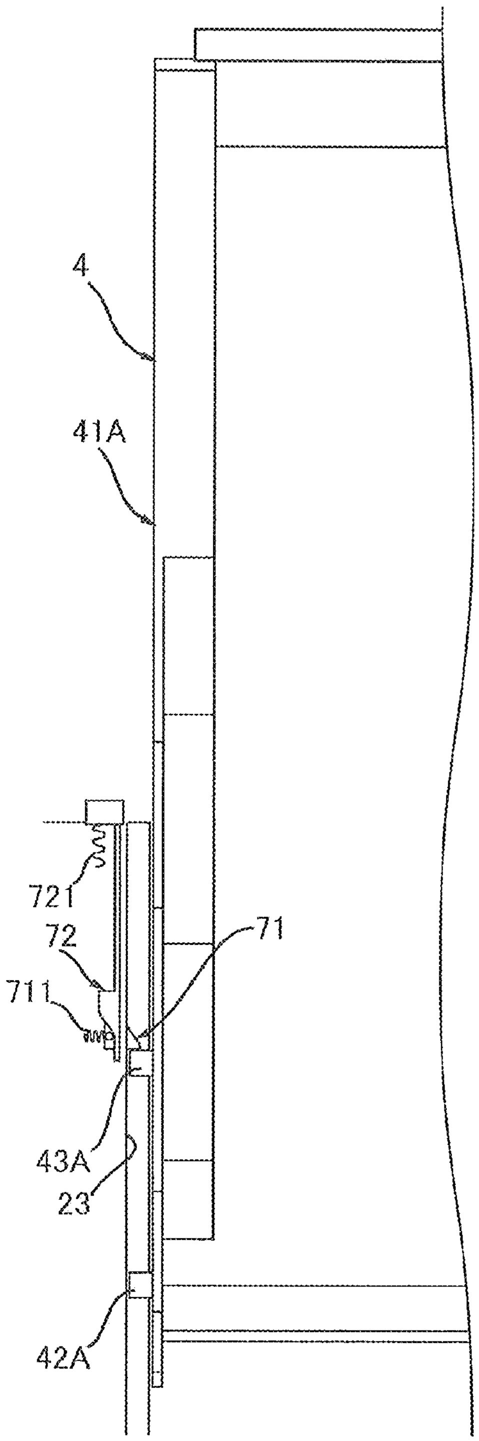
FIG. 14A is an explanatory view of a stopper according to a second embodiment, the view illustrating a state in which a cam is located at a cam first position and a stopper is located at a first position.
Figure 14B:
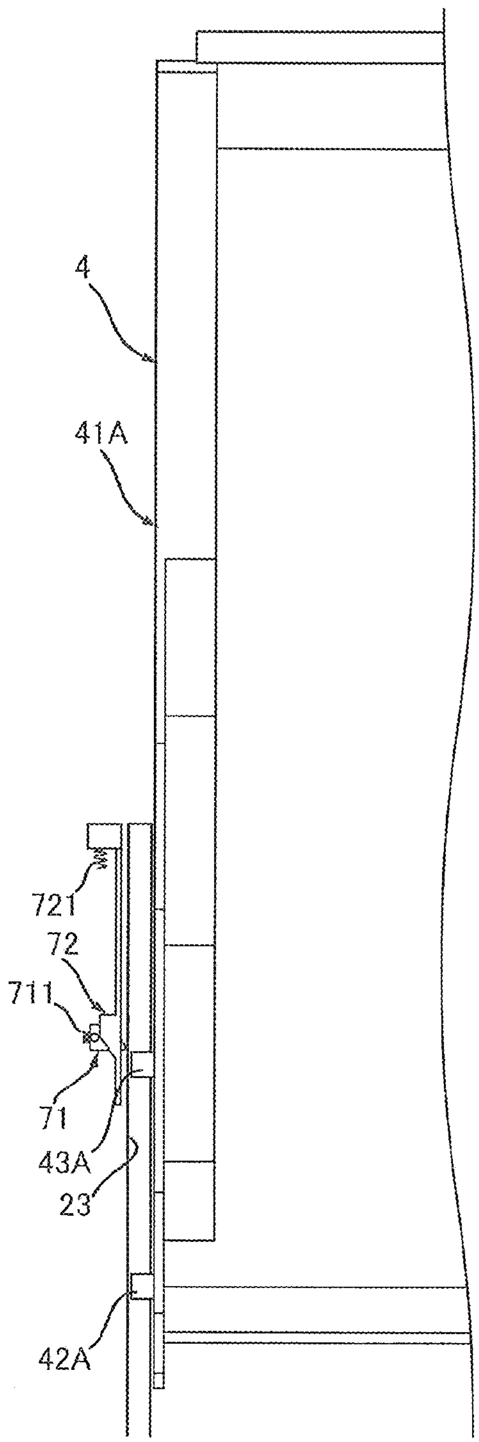
FIG. 14B illustrates a state in which the cam of FIG. 14A is located at a cam second position and the stopper is located at a second position.

In the second embodiment, the housing 2 includes a stopper 71 and a cam 72, in place of the stopper 24 (FIG. 2) of the first embodiment, as shown in FIGS. 14A and 14B. In other words, the image forming device 1 includes the cam 72.

9.1.1 Stopper 71

The stopper 71 includes a coil spring 711. The stopper 71 is movable between a first position (FIG. 14A) and a second position (FIG. 14B) against a force of the coil spring 711. The stopper 71 is movable from the second position (FIG. 14B) to the first position (FIG. 14A) by the force of the coil spring 711.

9.1.2 Cam 72

The cam 72 moves the stopper 71 from the first position to the second position.

Specifically, the cam 72 is movable between a cam first position (FIG. 14A) and a cam second position (FIG. 14B). In a state in which the cam 72 is located at the cam first position, the stopper 71 is located at the first position. In a state in which the cam 72 is located at the cam second position, the stopper 71 is located at the second position. The cam 72 includes a coil spring 721. The cam 72 is movable from the cam first position to the cam second position against a force of the coil spring 721. The cam 72 is movable from the cam second position to the cam first position by the force of the coil spring 721.

When moving the drawer 4 from the intermediate position to the outside position, the user moves the cam 72 from the cam first position to the cam second position against the force of the coil spring 721, so that the stopper 71 is pushed by the cam 72 and moved from the first position to the second position.

When the stopper 71 is moved to the second position, the drawer 4 is allowed to move from the intermediate position to the outside position as shown in FIG. 14B. The user can move the drawer 4 from the intermediate position to the outside position while the cam 72 is kept located at the cam second position.

9.2 Details of Toner Cartridge 80

Figure 15:
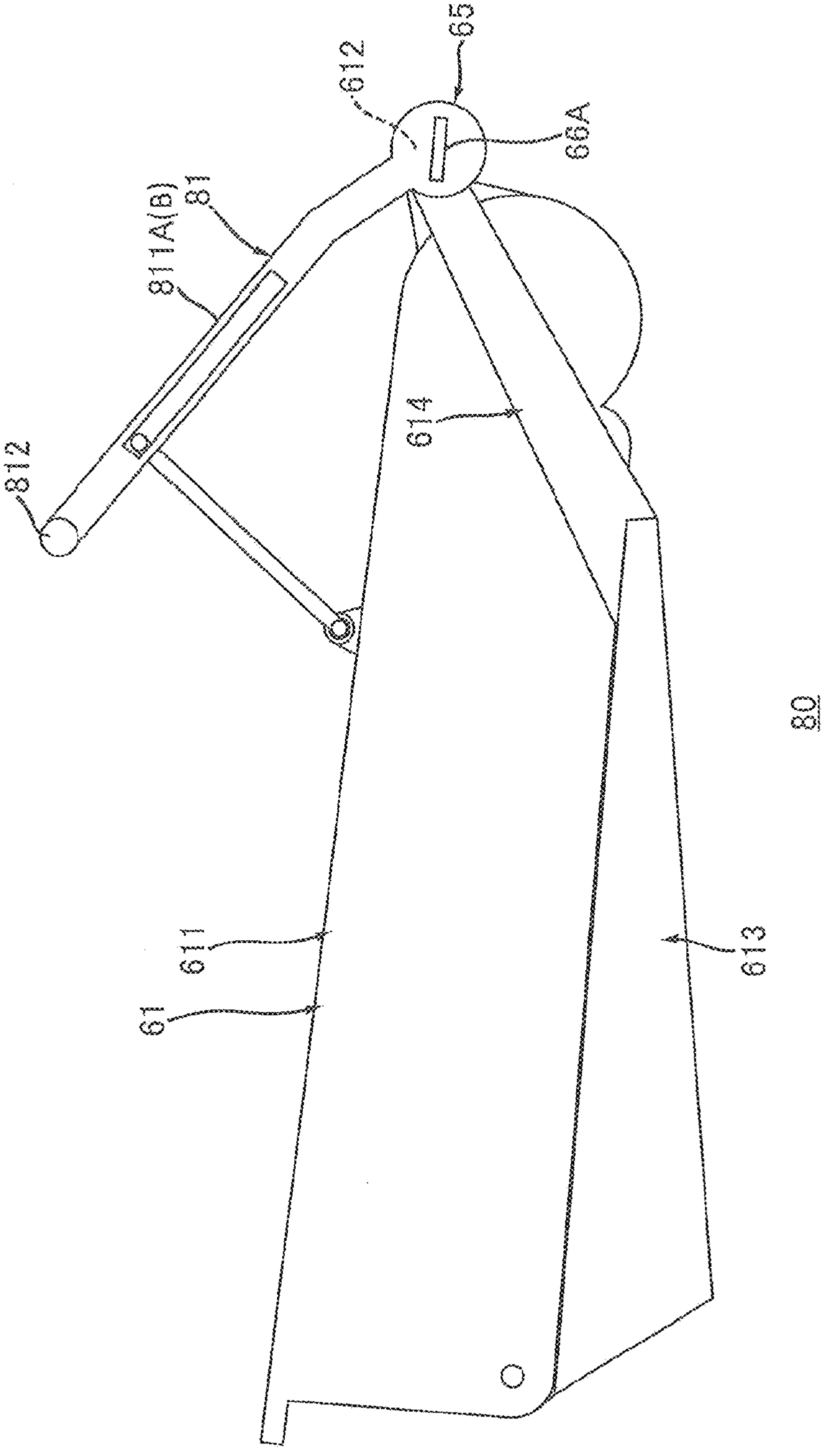
FIG. 15 is a side view of a toner cartridge according to the second embodiment.

A toner cartridge 80 of the second embodiment does not include the protrusion 615A, the protrusion 615B, the protrusion 616A, and the protrusion 616B as shown in FIG. 15. The toner cartridge 80 includes a handle 81.

Figure 16A:
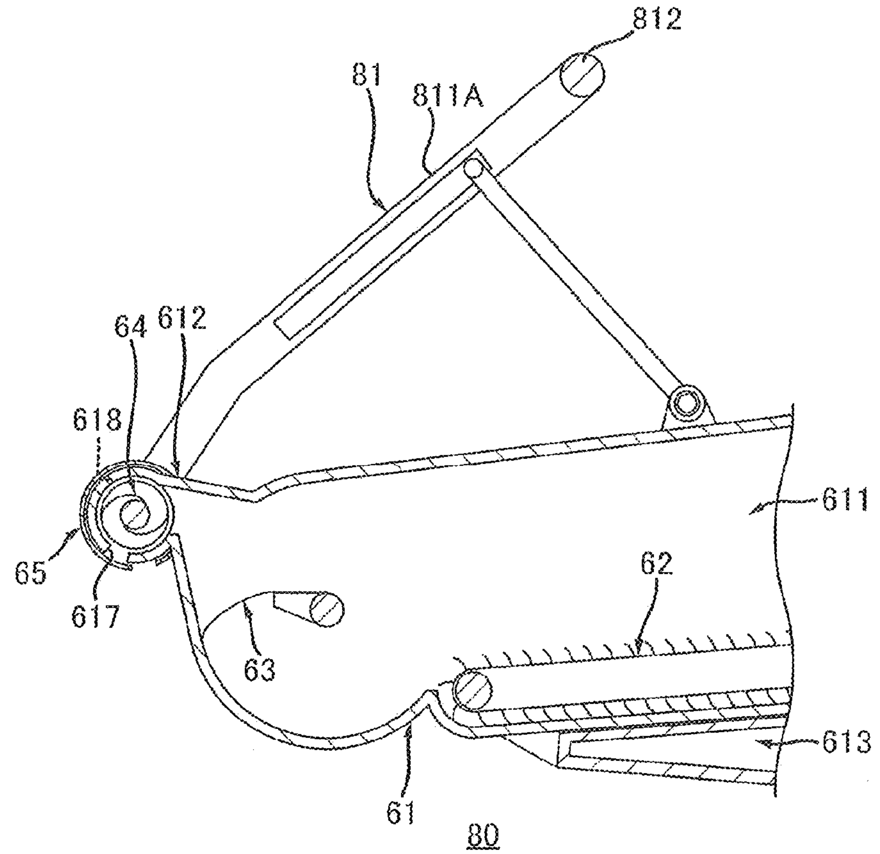
FIG. 16A is a cross-sectional view of the toner cartridge according to the second embodiment, the view illustrating a state in which a handle is located at a handle first position and the shutter is located at the closing position.
Figure 16B:
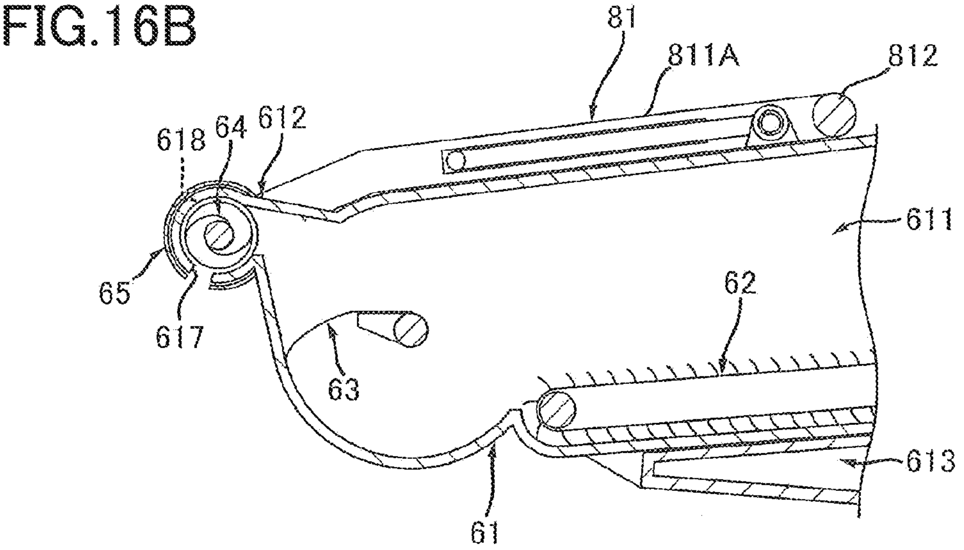
FIG. 16B illustrates a state in which the handle of FIG. 16A is located at a handle second position and the shutter is located at the open position.

The handle 81 is gripped by the user when the toner cartridge 80 is replaced. As shown in FIGS. 16A and 16B, the handle 81 is pivotable about the toner supply portion 612 between a handle first position (FIG. 16A) and a handle second position (FIG. 16B). The handle 81 is pivotable in conjunction with the shutter 65. As shown in FIG. 16A, the shutter 65 is located at the closing position when the handle 81 is located at the handle first position. As shown in FIG. 16B, the shutter 65 is located at the open position when the handle 81 is located at the second position.

As shown in FIG. 15, the handle 81 includes an arm 811A, an arm 811B, and a toner grip 812. The arm 811B is not illustrated.

The arm 811A extends from the first end portion of the shutter 65 in the second direction. The arm 811A may be attached to the first end portion of the shutter 65 in the second direction.

The arm 811B is apart from the arm 811A in the second direction. The arm 811B extends from the second end portion of the shutter 65 in the second direction. The arm 811B may be attached to the second end portion of the shutter 65 in the second direction.

The toner grip 812 is located between the arm 811A and the arm 811B in the second direction. The toner grip 812 extends in the second direction. The toner grip 812 includes a first end portion in the second direction and a second end portion that is apart from the first end portion in the second direction. The first end portion of the toner grip 812 in the second direction is connected to the arm 811A, and the second end portion of the toner grip 812 in the second direction is connected to the arm 811B.

Figure 17:
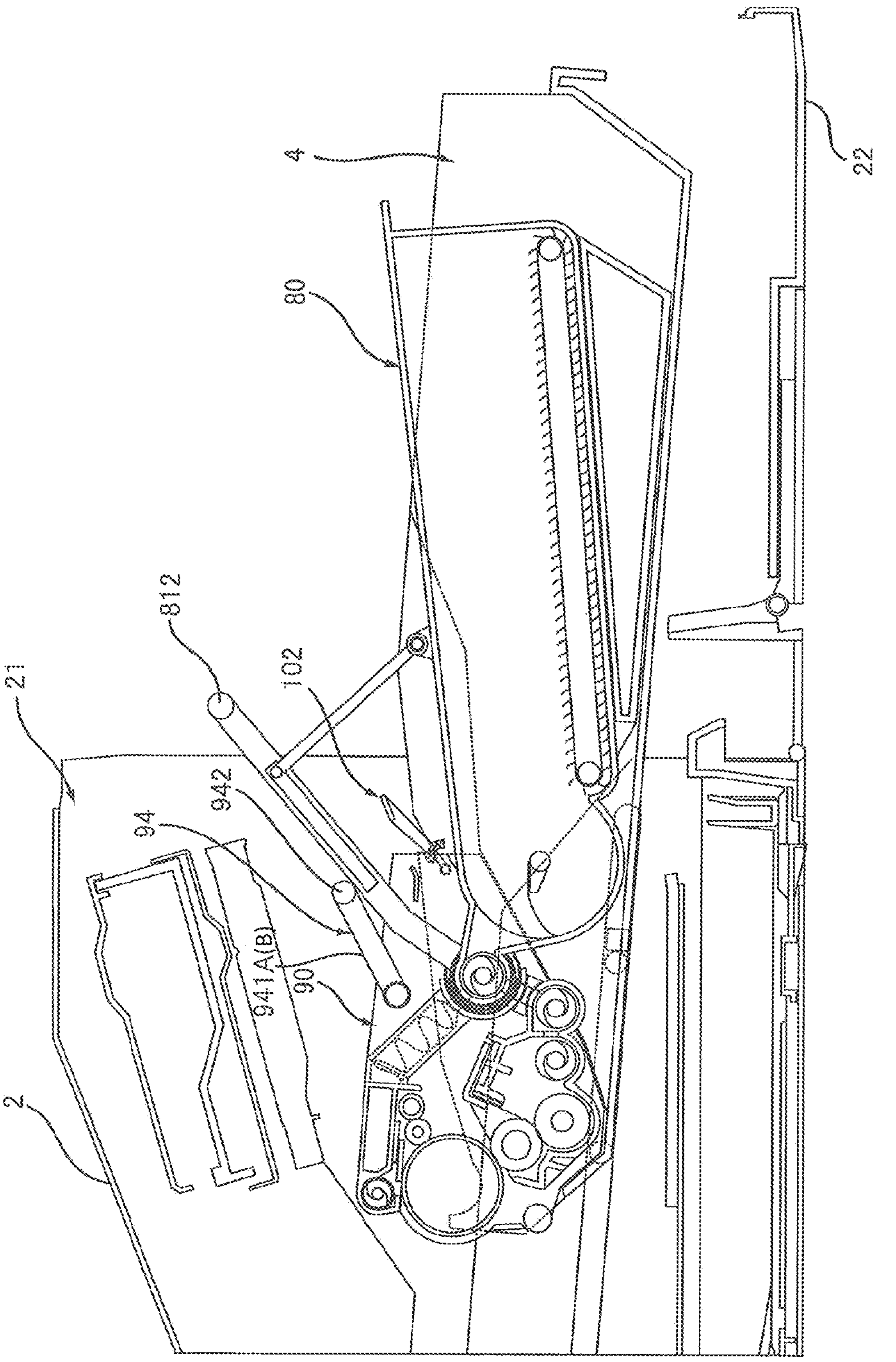
FIG. 17 illustrates an image forming device according to the second embodiment in a state in which the drawer is located at the intermediate position and the handle is located at the handle first position.

As shown in FIG. 17, the toner grip 812 is located outside the housing 2 in the state in which a drum cartridge 90 and the toner cartridge 80 are mounted on the drawer 4 and the drawer 4 is located at the intermediate position. Thus, the toner grip 812 can be easily gripped in the state in which the drawer 4 is located at the intermediate position, so that the toner cartridge 80 can be smoothly detached from the drawer 4.

9.3 Details of Drum Cartridge 90

Figure 18A:
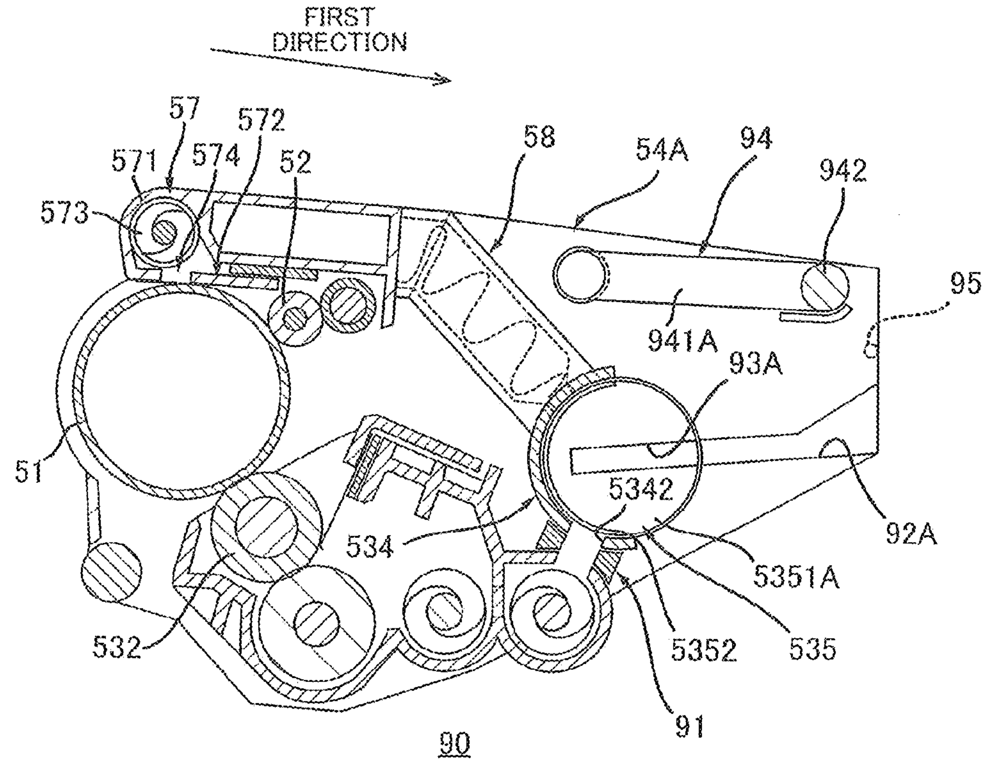
FIG. 18A is a cross-sectional view of a drum cartridge according to the second embodiment, the view illustrating a state in which the shutter is located at the closing position.

As shown in FIG. 18A, the drum cartridge 90 of the second embodiment does not include the tray 533 (FIG. 8A). The first end portion of the connection portion 534 in the second direction is connected to the drum cartridge side plate 54A. The second end portion of the connection portion 534 in the second direction is connected to the drum cartridge side plate 54B. The drum cartridge 90 does not include the seal 59 (FIG. 8A). The waste-toner conveyor pipe 58 is connected to the connection portion 534. The drum cartridge 90 include a seal 91 that is provided between the developer housing 531 and the connection portion 534 so as to surround the inlet opening 5342. The seal 91 prevents leakage of the toner received in the inlet opening 5342 from between the connection portion 534 and the developer housing 531.

The drum cartridge side plate 54A of the drum cartridge 90 includes a guide 92A (as one example of "third guide"). The shutter end plate 5351A of the shutter 535 has a groove 93A in place of the groove 5353A and the groove 5354A of the first embodiment. The drum cartridge 90 includes a handle 94 and a locked portion 95.

9.3.1 Guide 92A

In mounting the toner cartridge 80 on the drawer 4 in the state in which the drum cartridge 90 is mounted on the drawer 4, the guided portion 66A (FIG. 15) of the toner cartridge 80 engages the guide 92A. In mounting the toner cartridge 80 on the drawer 4 on which the drum cartridge 90 is mounted, the guide 92A guides the guided portion 66A toward the connection portion 534. Thus, the guide 92A guides the toner supply portion 612 (FIG. 15) of the toner cartridge 80 toward the connection portion 534 in mounting the toner cartridge 80 on the drawer 4 on which the drum cartridge 90 is mounted.

9.3.2 Groove 93A

Figure 18B:
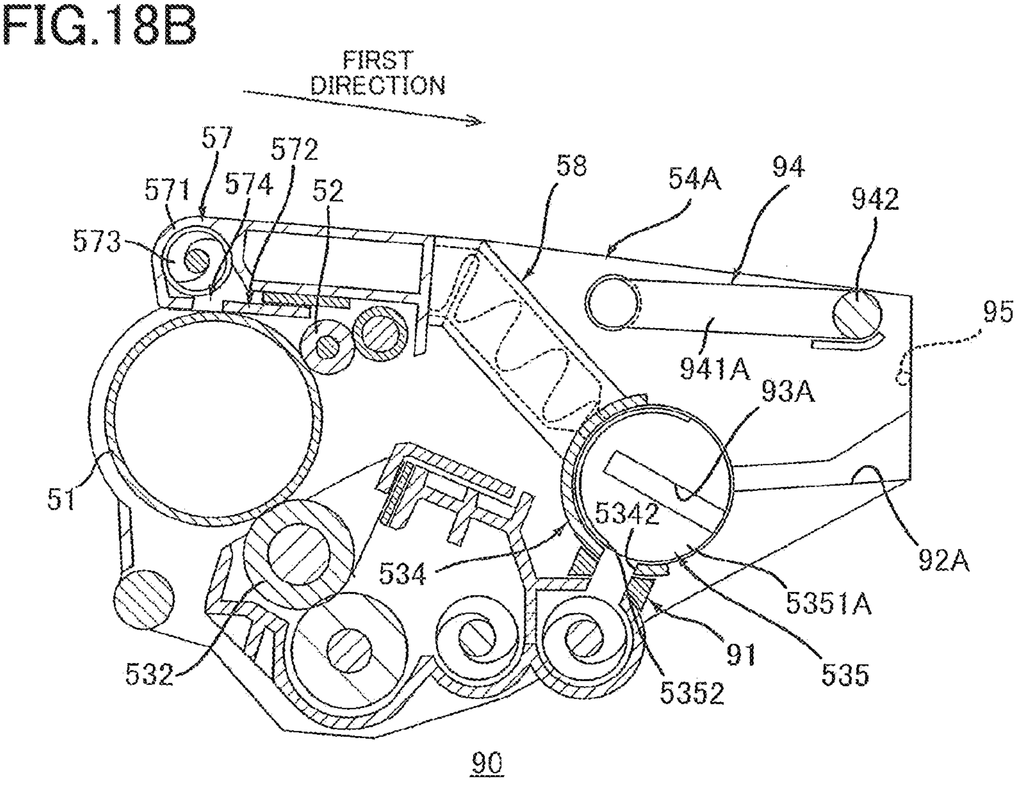
FIG. 18B illustrates a state in which the shutter of FIG. 18A is located at the open position.

The groove 93A extends in the radial direction of the shutter end plate 5351A. In the state in which the shutter 535 is located at the closing position, the groove 93A is connected to the guide 92A. In the state in which the shutter 535 is located at the open position, the groove 93A is not connected to the guide 92A as shown in FIG. 18B. In the state in which the drum cartridge 90 and the toner cartridge 80 are mounted on the drawer 4, the guided portion 66A (FIG. 15) of the toner cartridge 80 engages the groove 93A. When the guided portion 66A engages the groove 93A, the shutter 535 becomes movable together with the shutter 65.

Specifically, in the state in which the drum cartridge 90 and the toner cartridge 80 are mounted on the drawer 4 and the handle 81 is located at the handle first position, the shutter 65 (FIG. 16A) is located at the closing position and the shutter 535 (FIG. 18A) is located at the closing position. That is, in the state in which the handle 81 is located at the handle first position, the handle 81 causes the shutter 65 to be located at the closing position and causes the shutter 535 to be located at the closing position.

In the state in which the drum cartridge 90 and the toner cartridge 80 are mounted on the drawer 4 and the handle 81 is located at the handle second position, the shutter 65 (FIG. 16B) is located at the open position and the shutter 535 (FIG. 18B) is located at the open position. That is, in the state in which the handle 81 is located at the handle second position, the handle 81 causes the shutter 65 to be located at the open position and causes the shutter 535 to be located at the open position.

9.3.3 Handle 94

The handle 94 shown in FIG. 17 is gripped by the user when the drum cartridge 90 is replaced. The handle 94 includes an arm 941A, an arm 941B, and a drum grip 942. In other words, the drum cartridge 90 includes the drum grip 942. The arm 941B is not illustrated.

As shown in FIG. 18A, the arm 941A is attached to the drum cartridge side plate 54A. Specifically, the arm 941A includes a first end portion and a second end portion. The first end portion of the arm 941A is attached to the drum cartridge side plate 54A. The second end portion of the arm 941A is apart from the first end portion of the arm 941A in a direction in which the arm 941A extends. The arm 941A is pivotable with respect to the drum cartridge side plate 54A. The arm 941A is pivotable about the first end portion of the arm 941A.

The arm 941B is apart from the arm 941A in the second direction. The arm 941B is attached to the drum cartridge side plate 54B. The arm 941B is pivotable with respect to the drum cartridge side plate 54B. The above explanation of the arm 941A is true of the arm 941B.

The drum grip 942 is located between the arm 941A and the arm 941B in the second direction. Specifically, the drum grip 942 is located between the second end portion of the arm 941A and the second end portion of the arm 941B in the second direction. The drum grip 942 extends in the second direction. The drum grip 942 includes a first end portion in the second direction and a second end portion that is apart from the first end portion in the second direction. The first end portion of the drum grip 942 in the second direction is connected to the arm 941A, and the second end portion of the drum grip 942 in the second direction is connected to the arm 941B.

As shown in FIG. 17, the drum grip 942 is located inside the housing 2 in the state in which the drum cartridge 90 is mounted on the drawer 4 and the drawer 4 is located at the intermediate position. It is thus possible to prevent the user from erroneously gripping the drum grip 942 in the state in which the drawer 4 is located at the intermediate position.

Figure 19:
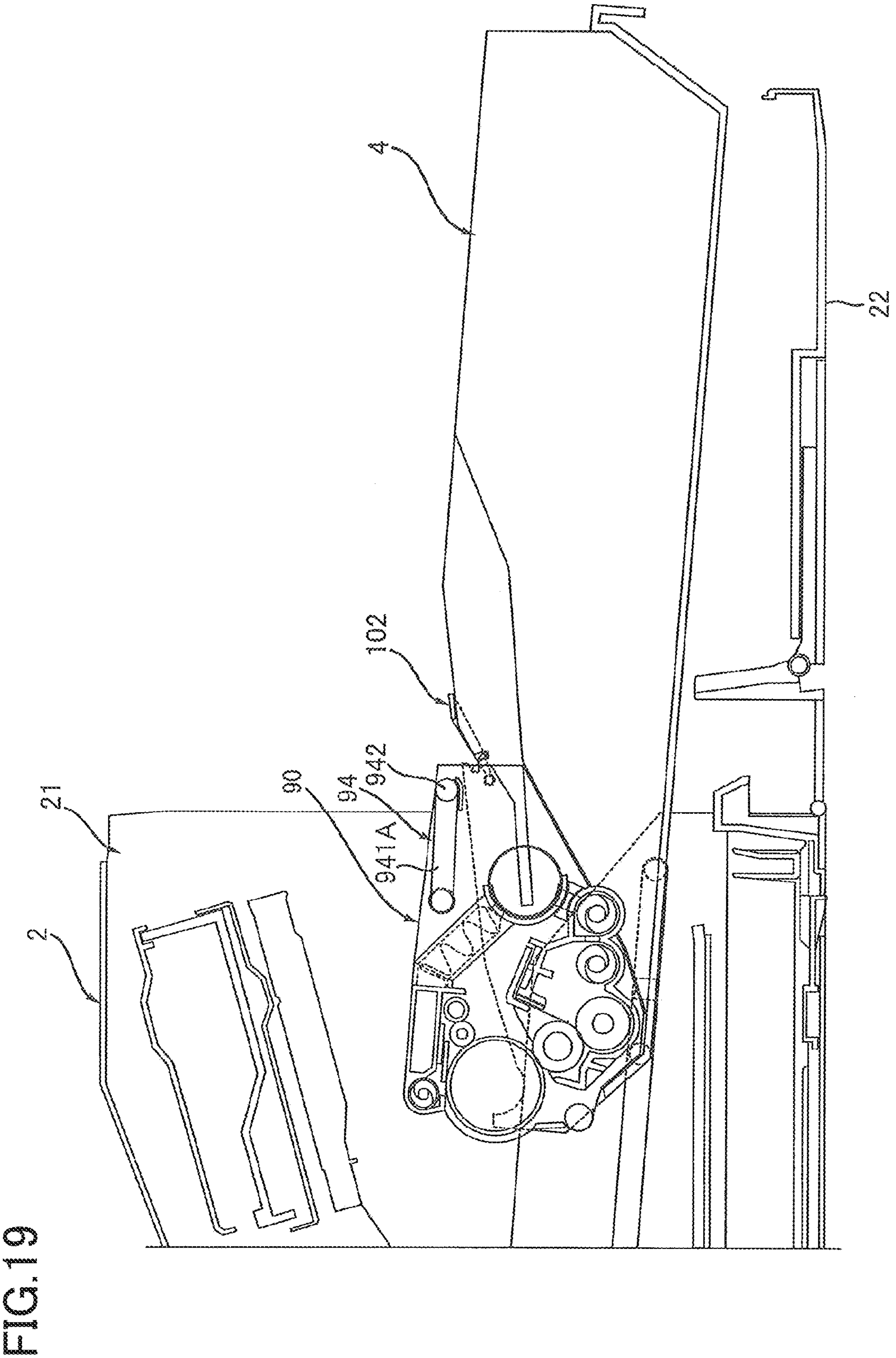
FIG. 19 illustrates the image forming device of FIG. 17 in a state in which the toner cartridge is detached from the drawer and the drawer is located at the outside position.

As shown in FIG. 19, the drum grip 942 is located outside the housing 2 in the state in which the drum cartridge 90 is mounted on the drawer 4 and the drawer 4 is located at the outside position. Thus, the user can easily grip the drum grip 942 in the state in which the drawer 4 is located at the outside position, so that the drum cartridge 90 can be smoothly detached from the drawer 4.

9.3.4 Locked Portion 95

As shown in FIG. 18A, the locked portion 95 extends from the first surface S21 (FIG. 7) of the drum cartridge side plate 54A. The locked portion 95 may be attached to the first surface S21 of the drum cartridge side plate 54A. The locked portion 95 extends in the second direction and has a cylindrical columnar shape.

The locked portion 95 is apart from the photoconductive drum 51 in the first direction. The locked portion 95 is located opposite to the photoconductive drum 51 with respect to the connection portion 534 in the first direction. In other words, the connection portion 534 is located between the locked portion 95 and the photoconductive drum 51 in the first direction. The locked portion 95 is located opposite to the photoconductive drum 51 with respect to the inlet opening 5342 in the first direction. The locked portion 95 is located opposite to the photoconductive drum 51 with respect to the shutter 535 in the first direction. The locked portion 95 engages a locking portion 101 (FIG. 20A) of the drawer 4 in the state in which the drum cartridge 90 is mounted on the drawer 4. The locking portion 101 will be later explained. The locked portion 95 engages the locking portion 101, whereby the locked portion 95 is locked at the locking portion 101. Thus, the drum cartridge 90 is locked at the locking portion 101 in the state in which the drum cartridge 90 is mounted on the drawer 4.

The drum cartridge 90 is thus locked at the locking portion 101, so that the drum cartridge 90 is prevented from coming off from the drawer 4 in detaching the toner cartridge 80 from the drawer 4. As a result, the toner cartridge 80 can be smoothly replaced in the state in which the drum cartridge 90 is mounted on the drawer 4.

9.4 Details of Drawer 4

The drum cartridge 90 of the second embodiment is locked with respect to the drawer 4 in the state in which the drum cartridge 90 is mounted on the drawer 4. Specifically, the drawer 4 includes the locking portion 101 and a locking lever 102.

9.4.1 Locking Portion 101

The locking portion 101 is provided at an edge of the drawer side plate 41A. The locking portion 101 may be provided on the second surface S2 (FIG. 5) of the drawer side plate 41A. The locking portion 101 is located between the first end portion 461 (FIG. 6) of the guide 46A and the second end portion 462 (FIG. 6) of the guide 46A in the first direction. The locking portion 101 is a groove.

9.4.2 Locking Lever 102

The locking lever 102 is attached to the drawer side plate 41A of the drawer 4. The locking lever 102 is movable between a lock position (FIG. 20A) and an unlock position (FIG. 20B).

Figure 20A:
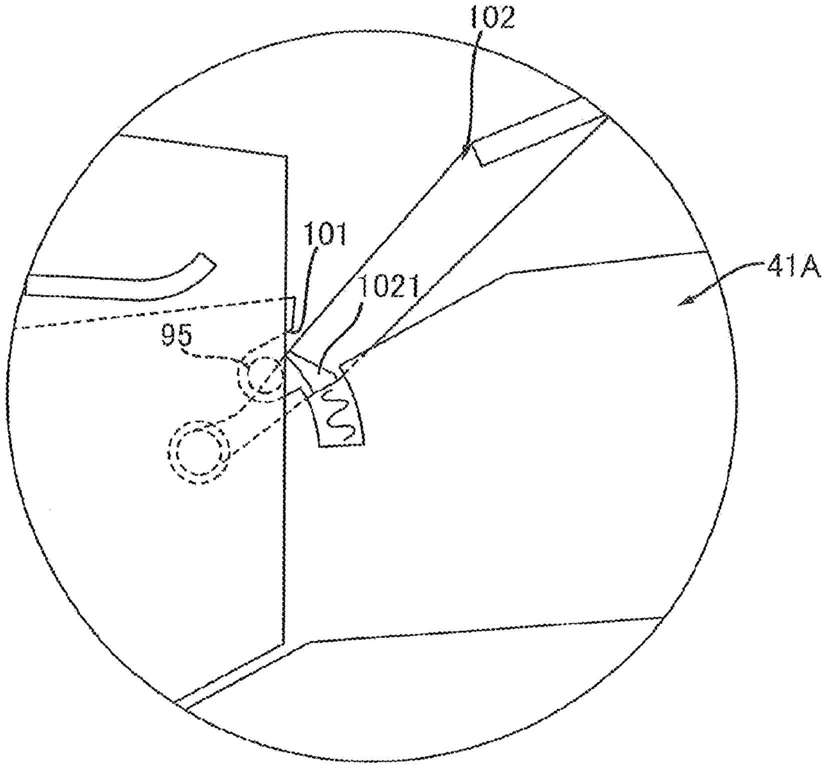
FIG. 20A is an enlarged view of a locking lever of FIG. 17 in a state in which the locking lever is located at a lock position.

As shown in FIG. 20A, the locking lever 102 includes a protrusion 1021. When the locking lever 102 is located at the lock position, the protrusion 1021 is located in the locking portion 101. If the user tries to detach the drum cartridge 90 from the drawer 4 in the state in which the locking lever 102 is located at the lock position, the locked portion 95 of the drum cartridge 90 comes into contact with the protrusion 1021 of the locking lever 102. Thus, the drum cartridge 90 cannot be detached from the drawer 4 in the state in which the locking lever 102 is located at the lock position. That is, the locking lever 102 locks the drum cartridge 90 at the locking portion 101 in the state in which the locking lever 102 is located at the lock position.

As shown in FIG. 17, the locking lever 102 is located in the housing 2 in the state in which the drawer 4 is located at the intermediate position. Thus, the user is prevented from erroneously operating the locking lever 102 in the state in which the drawer 4 is located at the intermediate position.

Figure 20B:
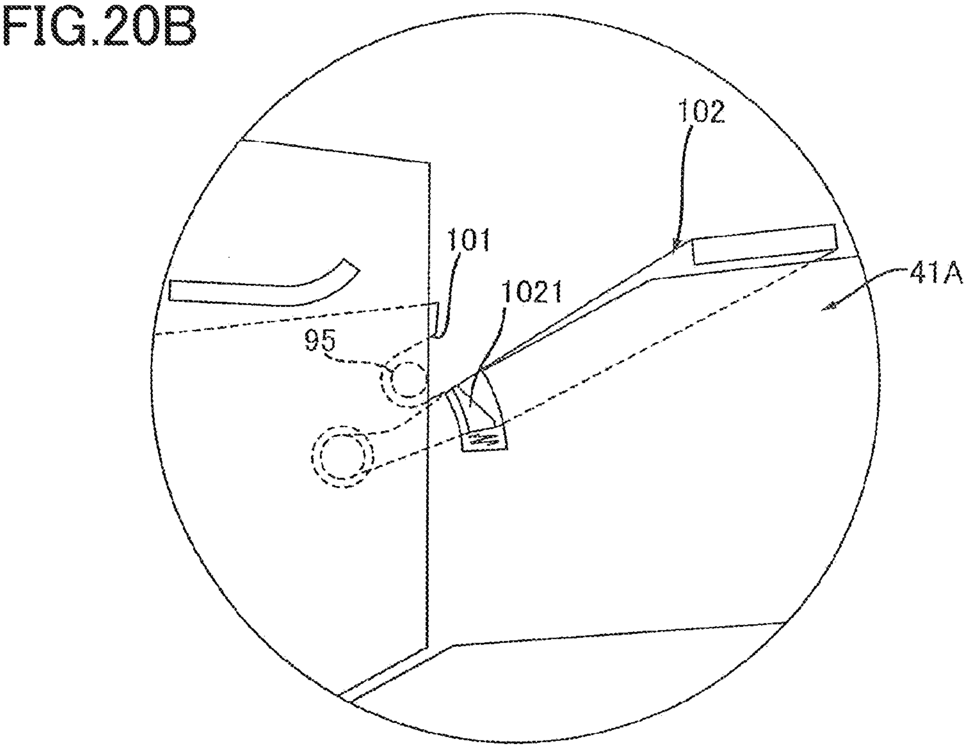
FIG. 20B illustrates a state in which the locking lever of FIG. 20A is located at an unlock position.

On the other hand, the protrusion 1021 is not located in the locking portion 101 as shown in FIG. 20B in the state in which the locking lever 102 is located at the unlock position. Thus, the drum cartridge 90 is unlocked from the locking portion 101 in the state in which the locking lever 102 is located at the unlock position. As a result, the drum cartridge 90 can be detached from the drawer 4 in the state in which the locking lever 102 is located at the unlock position.

As shown in FIG. 19, the locking lever 102 is located outside the housing 2 in the state in which the drawer 4 is located at the outside position. Thus, the user can easily operate the locking lever 102 in the state in which the drawer 4 is located at the outside position.

9.5 Advantageous Effects of Second Embodiment (1) In the image forming device 1 according to the second embodiment, the drum cartridge 90 is locked at the locking portion 101 as shown in FIG. 20A in the state in which the drum cartridge 90 is mounted on the drawer 4.

Thus, the drum cartridge 90 is prevented from coming off from the drawer 4 when the user detaches the toner cartridge 80 from the drawer 4.

As a result, the toner cartridge 80 can be smoothly replaced in the state in which the drum cartridge 90 is mounted on the drawer 4.

(2) In the image forming device 1 according to the second embodiment, the locking lever 102 is located in the housing 2 as shown in FIG. 17 in the state in which the drawer 4 is located at the intermediate position.

Thus, the user is prevented from erroneously operating the locking lever 102 in the state in which the drawer 4 is located at the intermediate position.

The locking lever 102 is located outside the housing 2 as shown in FIG. 19 in the state in which the drawer 4 is located at the outside position.

Thus, the user can operate the locking lever 102 in the state in which the drawer 4 is located at the outside position.

(3) In the image forming device 1 according to the second embodiment, the toner grip 812 of the handle 81 may be located outside the housing 2 as shown in FIG. 17 in the state in which the toner cartridge 80 is mounted on the drawer 4 and the drawer 4 is located at the intermediate position.

Thus, the user can easily grip the toner grip 812 in the state in which the drawer 4 is located at the intermediate position.

As a result, the toner cartridge 80 can be smoothly detached from the drawer 4 in the state in which the drum cartridge 90 is mounted on the drawer 4.

(4) In the image forming device 1 according to the second embodiment, the drum grip 942 is located in the housing 2 as shown in FIG. 17 in the state in which the drum cartridge 90 is mounted on the drawer 4 and the drawer 4 is located at the intermediate position.

Thus, the user is prevented from erroneously gripping the drum grip 942 in the state in which the drawer 4 is located at the intermediate position.

The drum grip 942 is located outside the housing 2 as shown in FIG. 19 in the state in which the drum cartridge 90 is mounted on the drawer 4 and the drawer 4 is located at the outside position.

Thus, the user can easily grip the drum grip 942 in the state in which the drawer 4 is located at the outside position.

Accordingly, the drum cartridge 90 can be smoothly detached from the drawer 4.

(5) The image forming device according to the second embodiment enjoys the advantages similar to those in the image forming device according to the first embodiment.

What is claimed is:

1. An image forming device, comprising:

a housing:

a drum cartridge including a photoconductive drum and a developer roller; and a toner cartridge storing toner;

wherein, in a state in which the drum cartridge and the toner cartridge are connected to each other, the drum cartridge and the toner cartridge are movable in a first direction from an inside position at which the toner cartridge is located inside the housing to an outside position at which the toner cartridge is located outside the housing, wherein the toner cartridge includes a toner storage portion storing the toner and a toner supply portion capable of supplying the toner to the drum cartridge in the state in which the drum cartridge and the toner cartridge are connected to each other, the toner supply portion being located at a most downstream portion of the toner cartridge in a direction from the outside position to the inside position, wherein the drum cartridge includes a connection portion connected to the toner supply portion in the state in which the drum cartridge and the toner cartridge are connected to each other, wherein the toner supply portion includes a discharge opening from which the toner is discharged, wherein the toner cartridge includes a first shutter movable between a first closing position at which the first shutter closes the discharge opening and a first open position at which the first shutter opens the discharge opening, wherein the connection portion includes an inlet opening through which the toner discharged from the discharge opening of the toner cartridge is received, wherein the drum cartridge includes a second shutter movable between a second closing position at which the second shutter closes the inlet opening and a second open position at which the second shutter opens the inlet opening, wherein the toner cartridge includes a handle having an arm and a toner grip connected to one end of the arm, the other end of the arm is located nearer to the toner supply portion than the one end, and the handle is pivotable about an axis extending in a second direction through the other end, the second direction intersecting the first direction and being parallel to a direction in which the photoconductive drum extends, wherein the handle is pivotable between: a handle first position at which the handle causes the first shutter to be located at the first closing position and causes the second shutter to be located at the second closing position; and a handle second position at which the handle causes the first shutter to be located at the first open position and causes the second shutter to be located at the second open position, and wherein the arm extends in the first direction when the handle is located at the handle second position and the arm extends in a direction intersecting the first direction when the handle is located at the handle first position, so that the toner grip is located more distant from the toner storage portion when the handle is located at the handle first position than when the handle is located at the handle second position.

2. The image forming device according to claim 1, wherein the toner cartridge is attachable to and detachable from the drum cartridge when the handle is located at the handle first position, and the toner cartridge is unattachable to and undetachable from the drum cartridge when the handle is located at the handle second position.

3. The image forming device according to claim 2, wherein the drum cartridge includes a pair of drum cartridge side plates apart from each other in an axis direction of the drum cartridge, wherein the pair of drum cartridge side plates includes a pair of guides, wherein the second shutter includes a pair of shutter end plates, wherein the pair of shutter end plates includes a pair of grooves, wherein the toner cartridge includes a pair of guided portions configured to be guided by the pair of guides toward the pair of grooves, wherein, when the handle is located at the handle first position in a state in which the guided portions engage the grooves, the first shutter is located at the first closing position while the second shutter is located at the second closing position, and the guides and the grooves are connected to each other, and wherein, when the handle is located at the handle second position in the state in which the guided portions engage the grooves, the first shutter is located at the first open position while the second shutter is located at the second open position, and the guides and the grooves are not connected to each other.

4. The image forming device according to claim 1, wherein, when the drum cartridge and the toner cartridge are located at the inside position, the handle is prevented from moving from the handle second position to the handle first position, and wherein, when the drum cartridge and the toner cartridge are located at the outside position, the handle is allowed to move from the handle second position to the handle first position.

5. The image forming device according to claim 1, further comprising a drawer on which the drum cartridge and the toner cartridge are mounted, wherein the drawer is movable from a drawer inside position at which the drum cartridge and the toner cartridge are located at the inside position to a drawer outside position at which the drum cartridge and the toner cartridge are located at the outside position via an intermediate position between the drawer inside position and the drawer outside position.

6. The image forming device according to claim 5, wherein the drawer includes a locking portion at which the drum cartridge is locked with respect to the drawer in a state in which the drum cartridge is mounted on the drawer.

7. The image forming device according to claim 6, wherein the drawer includes a locking lever movable between a lock position at which the drum cartridge is locked at the locking portion and an unlock position at which the drum cartridge is unlocked from the locking portion, wherein the locking lever is located inside the housing when the drawer is located at the intermediate position, and wherein the locking lever is located outside the housing when the drawer is located at the drawer outside position.

8. The image forming device according to claim 7, wherein the drum cartridge includes a locked portion configured to engage the locking portion.

* * * * *